United States Patent [19]

Takagi

[11] Patent Number: 5,504,553
[45] Date of Patent: Apr. 2, 1996

[54] AUTOMATIC LIGHT ADJUSTMENT APPARATUS FOR A CAMERA ON WHICH A PHOTOGRAPHIC LENS CAN BE FREELY MOUNTED

[75] Inventor: Tadao Takagi, Yokohama, Japan

[73] Assignee: Nikon Corporation, Tokyo, Japan

[21] Appl. No.: 486,692

[22] Filed: Jun. 7, 1995

Related U.S. Application Data

[63] Continuation of Ser. No. 396,322, Feb. 28, 1995, abandoned, which is a continuation of Ser. No. 899,626, Jun. 16, 1992, abandoned.

[30]  Foreign Application Priority Data

Jun. 20, 1991  [JP]  Japan ................... 3-176137

[51] Int. Cl.[6] ................................... G03B 15/05
[52] U.S. Cl. .................... 354/415; 354/431; 354/432
[58] Field of Search ................... 354/415, 416, 354/431, 432, 433, 434, 286, 480

[56]  References Cited

U.S. PATENT DOCUMENTS

| | | | |
|---|---|---|---|
| Re. 32,437 | 6/1987 | Taniguchi et al. | 354/415 |
| 3,842,424 | 10/1974 | Tsunekawa et al. | 354/431 |
| 4,455,071 | 6/1984 | Kato et al. | 354/431 |
| 4,636,054 | 1/1987 | Saegusa | 354/432 |
| 4,717,934 | 1/1988 | Kobayashi | 354/415 |
| 4,833,498 | 5/1989 | Kato et al. | 354/286 X |
| 4,905,035 | 2/1990 | Takagi et al. | 354/432 |
| 4,965,620 | 10/1990 | Takagi et al. | 354/416 |
| 4,977,424 | 12/1990 | Mukai et al. | 354/432 X |
| 4,985,726 | 1/1991 | Fujibayashi et al. | 354/432 |
| 5,164,759 | 11/1992 | Yasukawa | 354/415 |
| 5,172,157 | 12/1992 | Takagi | 354/432 X |
| 5,218,397 | 6/1993 | Takagi | 354/415 |
| 5,221,941 | 6/1993 | Matsui | 354/415 |
| 5,227,836 | 7/1993 | Yasukawa et al. | 354/415 |
| 5,231,447 | 7/1993 | Takagi | 354/415 |
| 5,231,448 | 7/1993 | Sato et al. | 354/431 |

FOREIGN PATENT DOCUMENTS

| | | |
|---|---|---|
| 60-15626 | 1/1985 | Japan. |
| 1-285925 | 11/1989 | Japan. |

*Primary Examiner*—Russell E. Adams
*Attorney, Agent, or Firm*—Shapiro and Shapiro

[57]  ABSTRACT

An automatic light adjustment apparatus for a camera on which a photographic lens can be mounted freely comprises a flash device capable of emitting light, a photometric device which divides a field into a plurality of areas for the photometry of the light beam which is emitted from the flash device and reflected by each of the areas, in which the light beam is arranged to reach the photometric device after being reflected by the film plane, a photometric output correcting device which corrects the photometric output of the photometric device in accordance with the characteristics of the mounted photographic lens, and a light adjustment controlling device which suspends the light emission of the flash device in accordance with the photometric output corrected by the photometric output correcting device.

17 Claims, 32 Drawing Sheets

| ENCO POS | NOMI DIST | FOC DIST | | | | | | | | |
|---|---|---|---|---|---|---|---|---|---|---|
| | | 35 | | 37 | | 40 | | 4... | | 70 |
| | | INFI | NEAR | INFI | NEAR | INFI | NEAR | INFI | ... | INFI | NEAR |
| 1 | 7.55 | 9.9 | 0.7 | 9.9 | 0.5 | 9.9 | 0.5 | 9. | | 9.9 | 0.2 |
| 2 | 5.66 | 0.5 | 0.5 | 0.4 | 0.4 | 0.4 | 0.4 | 0. | | 0.2 | 0.2 |
| 3 | 4.76 | 0.4 | 0.4 | 0.3 | 0.3 | 0.3 | 0.3 | 0 | | 0.1 | 0.1 |
| 4 | 4.00 | 0.3 | 0.3 | 0.3 | 0.3 | 0.3 | 0.3 | | | 0.1 | 0.1 |
| 5 | 3.36 | 0.3 | 0.3 | 0.2 | 0.3 | 0.2 | 0.2 | | | 0.1 | 0.1 |
| 6 | 2.83 | 0.2 | 0.3 | 0.2 | 0.2 | 0.2 | 0. | | | 0.1 | 0.1 |
| 7 | 2.38 | 0.2 | 0.2 | 0.2 | 0.2 | 0.1 | 0 | | | 0.1 | 0.1 |
| 8 | 2.00 | 0.2 | 0.2 | 0.1 | 0.1 | 0.1 | | | | 0.1 | 0.1 |
| 9 | 1.68 | 0.1 | 0.1 | 0.1 | 0.1 | 0.1 | | | | 0.1 | 0.1 |
| 10 | 1.41 | 0.1 | 0.1 | 0.1 | 0.1 | 0.1 | | | | 0.1 | 0.1 |
| 11 | 1.19 | 0.1 | 0.1 | 0.1 | 0.1 | | | | | 0.1 | 0.1 |
| 12 | 1.00 | 0.1 | 0.1 | 0.1 | 0.1 | | | | | 0.1 | 0.1 |
| 13 | 0.84 | 0.1 | 0.1 | 0.1 | 0.1 | | | | | 0.1 | 0.1 |
| 14 | 0.71 | 0.1 | 0.1 | 0.1 | 0.1 | | | | | 0.1 | 0.1 |
| 15 | 0.60 | 0.1 | 9.9 | 0.1 | 9.9 | | | | | 0.1 | 9.9 |
| 16 | 0.50 | 0.1 | | 9. | | | | | | 9.9 | 9.9 |

5,504,553

AUTOMATIC LIGHT ADJUSTMENT APPARATUS FOR A CAMERA ON WHICH A PHOTOGRAPHIC LENS CAN BE FREELY MOUNTED

This is a continuation of application Ser. No. 08/396,322 filed Feb. 28, 1995, which is a continuation of application Ser. No. 07/899,626 filed Jun. 16, 1992, both now abandoned.

BACKGROUND OF THE INVENTION

1. Field of the Invention

The present invention relates to an automatic light adjustment apparatus for a camera capable of conducting photometry by dividing a field into plural areas at the time of flash emission and a light adjustment in accordance with the photometric result.

2. Related Background Art

For a camera of the kind, there is known an autostrobe apparatus disclosed in the specification of Japanese Patent Laid-Open Application No. 60-15626. This apparatus has an electronic flash apparatus capable of performing its preliminary flashing and regular flashing to conduct at first a segmented photometry with the reflecting rays of light from subjects at the time of the preliminary flashing and then to determine the weighted amount for the regular flashing in accordance with the result of the segmented photometry. Subsequently, the electronic flash apparatus is caused to trigger the regular flash for the intended photography while conducting the segmented photometry with the above-mentioned weighting, and stop the regular flashing when the photometric value has reached a predetermined amount.

However, when such an autostrobe apparatus as above-mentioned is applied to a lens-exchangeable single-lens reflex camera, photometric errors occur in each of the segmented photometric areas due to the characteristics of a mounted lens, and there is a possibility that no light adjustment is performed correctly.

SUMMARY OF THE INVENTION

It is an object of the present invention to provide an automatic light adjustment apparatus for a camera capable of performing a correct light adjustment always irrespective of the characteristics of a photographic lens to be mounted as well as photographic lenses to be marketed in the future.

BRIEF DESCRIPTION OF THE DRAWINGS

FIG. 24 is a table showing the near side and infinite side errors for nominal distances per focal length.

DETAILED DESCRIPTION OF THE PREFERRED EMBODIMENTS

Figure 1A:
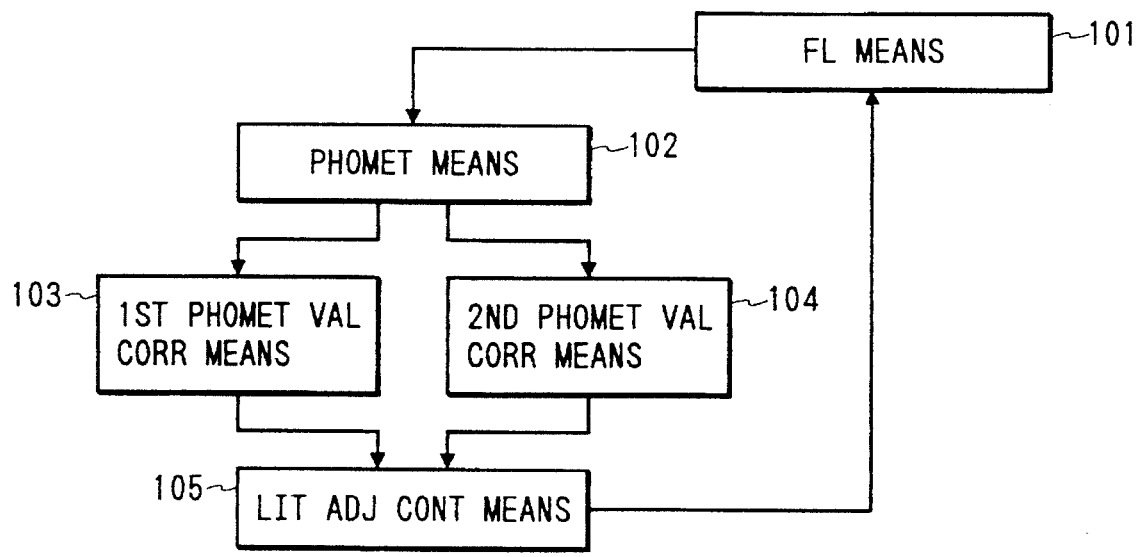
FIG. 1A and FIG. 1B are block diagrams of two embodiments.

Now, in accordance with FIG. 1A, an embodiment will be described. An automatic light adjustment apparatus for a camera according to the present invention is provided with flashing means 101 capable of conducting preliminary flashing and regular flashing; photometric means 102 for conducting photometry by dividing the light beam emitted from the flashing means 101 and reflected by a field into a plurality of areas; a first photometric value correcting means 103 for correcting the photometric output of the photometry of the preliminary flash by the photometric means 102 with the shutter blade reflection in accordance with the characteristics of the mounted photographic lens; a second photometric value correcting means 104 for correcting the photometric output of the photometry of the regular flash by the photometric means 102 with the film plane reflection in accordance with the characteristics of the mounted photographic lens; and light adjustment controlling means 105 for stopping the regular flashing on the basis of the outputs of the first and second photometric value correcting means 103 and 104. Hence solving the problems encountered in the conventional art.

Figure 1B:
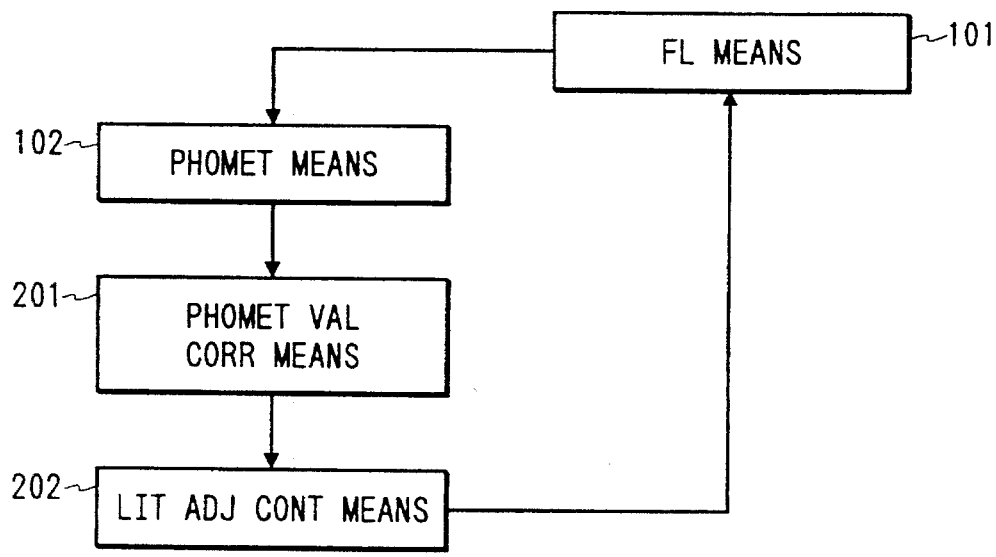

An automatic light adjustment apparatus for a camera according to another embodiment shown in FIG. 1B is provided with the above-mentioned flashing means 101; photometric means 102; photometric value correcting means 201 for correcting the photometric output of the photometry of the preliminary flash by the photometric means 102 with the shutter blade surface reflection and the photometric output of the photometry of the regular flash by the photometric means 102 with the film plane reflection in accordance with the characteristics of the photographic lens using a common correction value for one and the same photometric area; and light adjustment controlling means 202 for stopping the regular flashing on the basis of the output of this photometric value correction means 201.

The first photometric value correcting means 103 corrects the photometric output of the photometry of the preliminary flash by the photometric means 102 with the shutter blade reflection in accordance with the characteristics of the mounted photographic lens. Also, the second photometric value correcting means 104 corrects the photometric output of the photometry of the regular flash by the photometric means 102 with the film plane reflection in accordance with the characteristics of the mounted photographic lens. Then, on the basis of the outputs of the first and second photometric value correcting means 103 and 104, the light adjustment controlling means 105 stops the regular flashing.

The photometric value correction means 201 corrects photometric output of the photometry of the preliminary flash by the photometric means 102 with the shutter blade surface reflection and the photometric output of the photometry of the regular flash by the photometric means 102 with the film plane reflection in accordance with the characteristics of the photographic lens using a common correction value for one and the same photometric area. Then, the light adjustment controlling means 202 stops the regular flashing on the basis of the output of the photometric value correcting means 201.

In accordance with FIG. 2 to FIG. 30, details of the present invention will be described.

Figure 2:
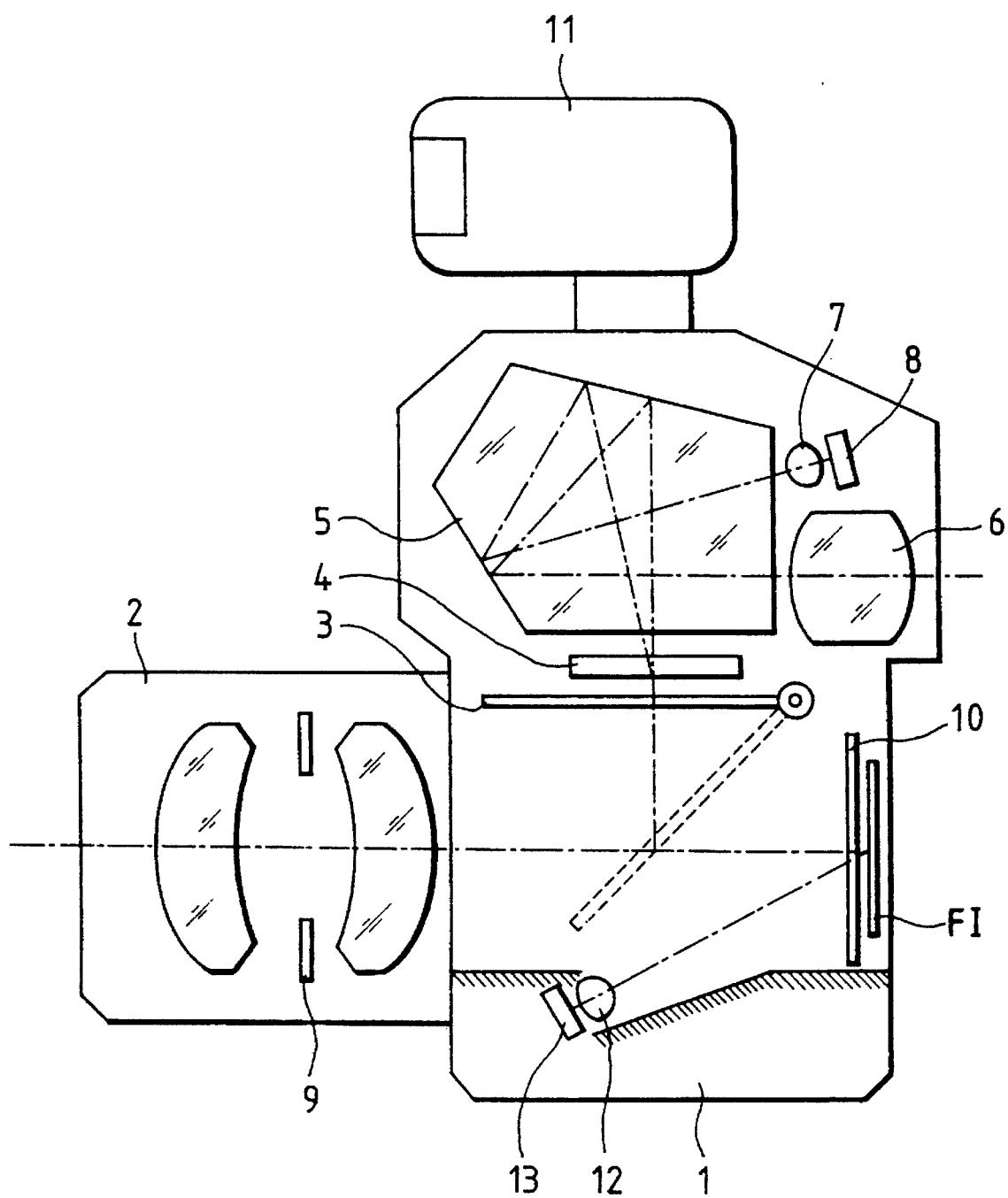
FIG. 2 is a schematic view showing the structure of an embodiment of an automatic light adjusting camera according to the present invention.
Figure 4:
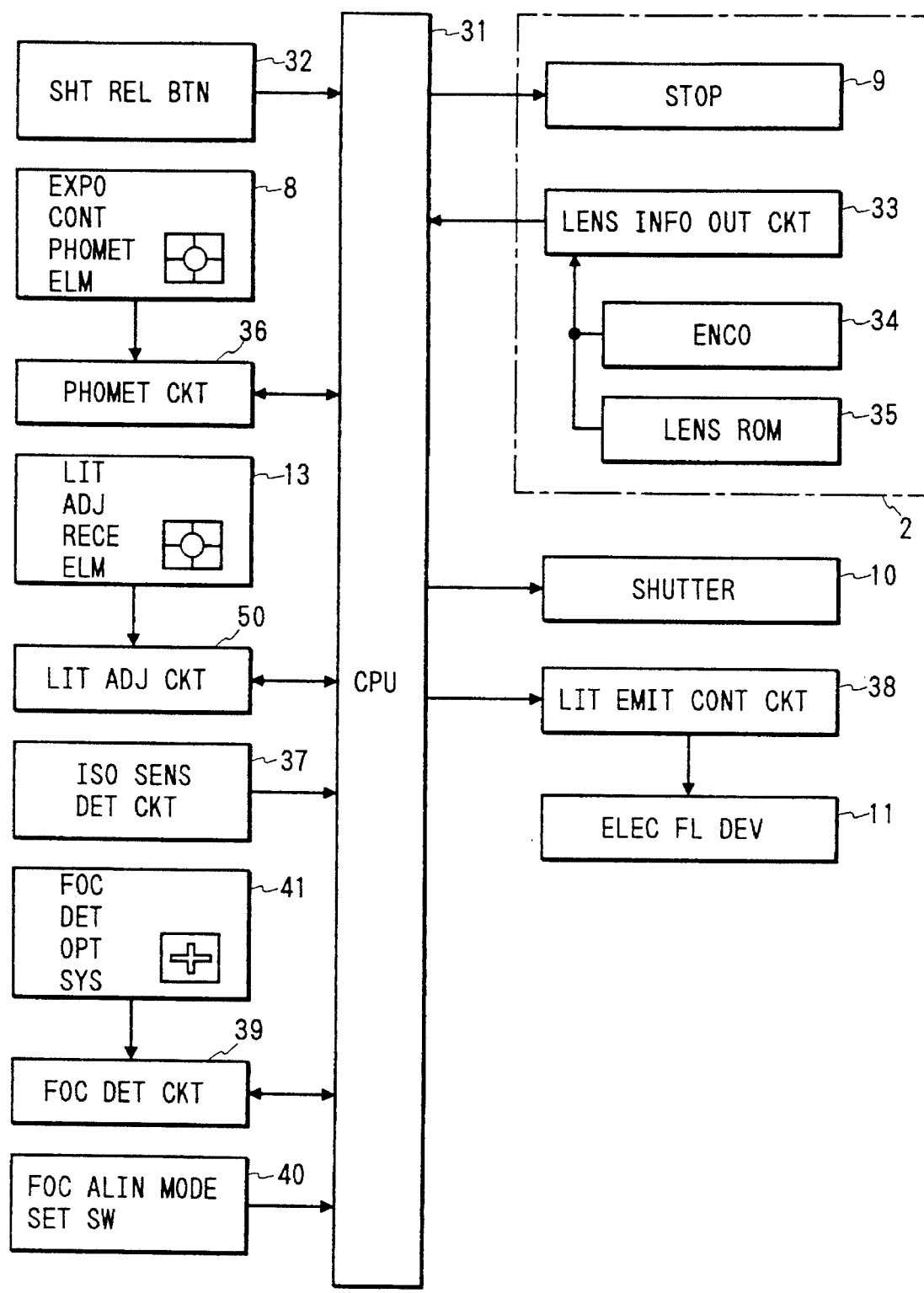
FIG. 4 is a block diagram showing the structure of an automatic light adjustment apparatus for a camera.

FIG. 2 illustrates the structure of a TTL automatic light adjusting camera. When observing from its finder, the light beam (stationary light) having passed the photographic lens 2 is reflected by a mirror 3 which is in the mirror down state as shown by a broken line, and a part thereof is guided to an ocular 6 through a screen 4 and pentagonal prism 5 while the other part is guided to an exposure calculation photometric element 8 through a condenser lens 7. Also, at the time of photographing, with a release button 32 being released, an iris 9 is stopped subsequent to the mirror 3 having been driven to the up position which is indicated by a solid line, and a shutter 10 is opened and closed as shown in FIG. 4. Thus, the objective light which passed the photographic lens 2 is conducted to a film FI and the film FI is exposed.

Also, at the time of conducting a flash photography, the electronic flash apparatus 11 triggers a regular flash to illuminate the subject after the shutter 10 is opened. Then, the reflecting light from the subject reaches the film plane through the photographic lens 2, and the light beam which is reflected from the film plane is received by the light receiving element 13 for the light adjustment through the condenser lens array 12. Furthermore, a camera according to the present embodiment is capable of conducting a preliminary flashing for examining the state of the field prior to the above-mentioned regular flashing. The reflecting light of this preliminary flash from the field is reflected by the blade surface of the shutter 10 before it is opened and is received by the light receiving element 13.

Figure 3:
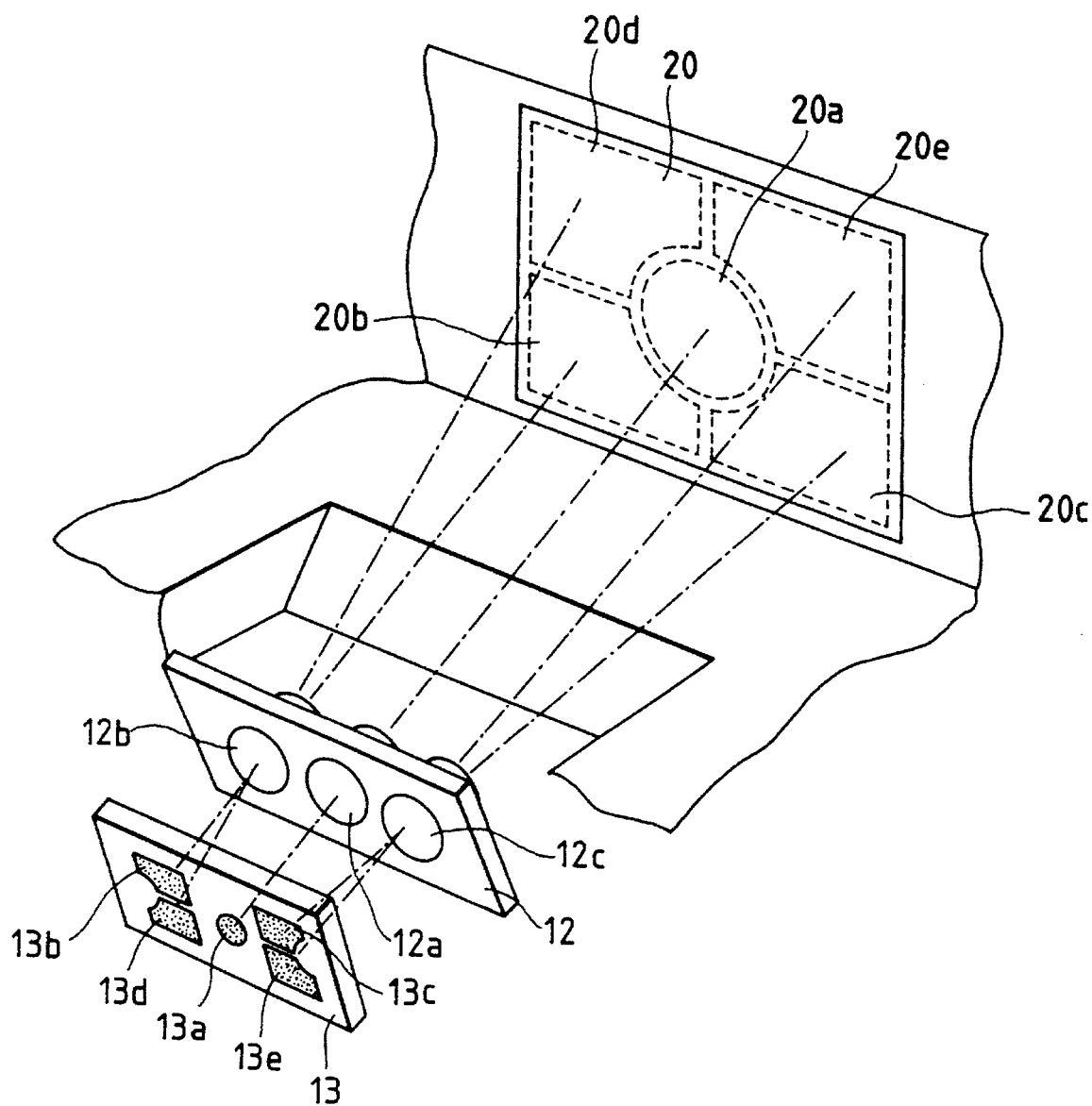
FIG. 3 is a perspective view showing the positional relationship between a condenser lens array segmental photometric element and a film.

On the same plane of the light receiving element 13, there are arranged as shown in FIG. 3 a segmented light receiving element 13a corresponding to the circular photometric area in the central portion of the field, and segmented light receiving elements 13b to 13e corresponding to the photometric areas of rectangular shapes each with a circular cut off on the periphery of the field. In other words, the field is divided into five photometric areas for the segmented photometry in the present embodiment. Also, condenser lens array 12 is an optical member having the three lens portions 12a to 12c which correspond to the three blocks, left, center, and right, of the above-mentioned light receiving elements 13a to 13e.

As shown in FIG. 3, when the exposure area 20 of one frame portion of the film plane is divided into five areas 20b to 20e, that is, the central circular portion 20a and the periphery which is divided into four, in the same way as the field, the above-mentioned three blocks, left, center, and right, of the light receiving elements 13a to 13e stand face to face with the left half, central, and right half portions of the film exposure area 20 through the three lens portions 12a to 12c of the condenser lens array 12 as indicated by broken lines, respectively. Further, as the light receiving element 13 and the film exposure area are substantially in a conjugate relation, the brightness of the five areas 20a to 20e is measured photometrically by dividing it into almost the same shapes.

FIG. 4 is a block diagram showing a control system, and to the CPU 31 which controls the sequences of a camera as a whole, a release button 32 and shutter 10 are connected and at the same time, the iris 9 in a photographic lens 2 and a lens information output circuit 33 are connected. From the lens information output circuit 33, object distance X detected by the known metering encoder 34 in a lens, iris stop value $F_0$ stored in a lens ROM 35, exit pupil distance PO, and error ΔX in the object distance due to the resolution of the encoder 34 and other information are inputted to the CPU 31.

Further, to the CPU 31, there are connected a photometric circuit 36 for operating photometry on the basis of the output from an exposure controlling photometric element 8, a light adjusting circuit 50 for operating light adjustment on the basis of the output from the light receiving element 13, that is, the segmented light receiving elements 13a to 13e, an ISO sensitivity detection circuit 37 for reading the ISO sensitivity of a loaded film FI from the DX code, and a flash controlling circuit 38 for the above-mentioned electronic flash apparatus 11. Here, the exposure controlling photometric element 8 comprises also five segmented photometric elements 8a to 8e which correspond to the respective photometric areas of the field as in the case of the light receiving element 13. Also, the known focus detection optical system 41 is to measure the distance of the central portion of an image plane, and its output is converted into a defocus amount ΔY by the focus detection circuit 39 and inputted into the CPU 31.

Also, a focus adjustment mode set switch 40 is the selection member which is provided to select either one of the three modes, S-AF (single AF mode) whereby to lock the photographic lens at a lens position where it is in focus with a subject after the start of the focusing, C-AF (continuance AF mode) whereby to perform focusing continuously as long as the release button is half depressed, and M (manual focus) mode.

Figure 5:
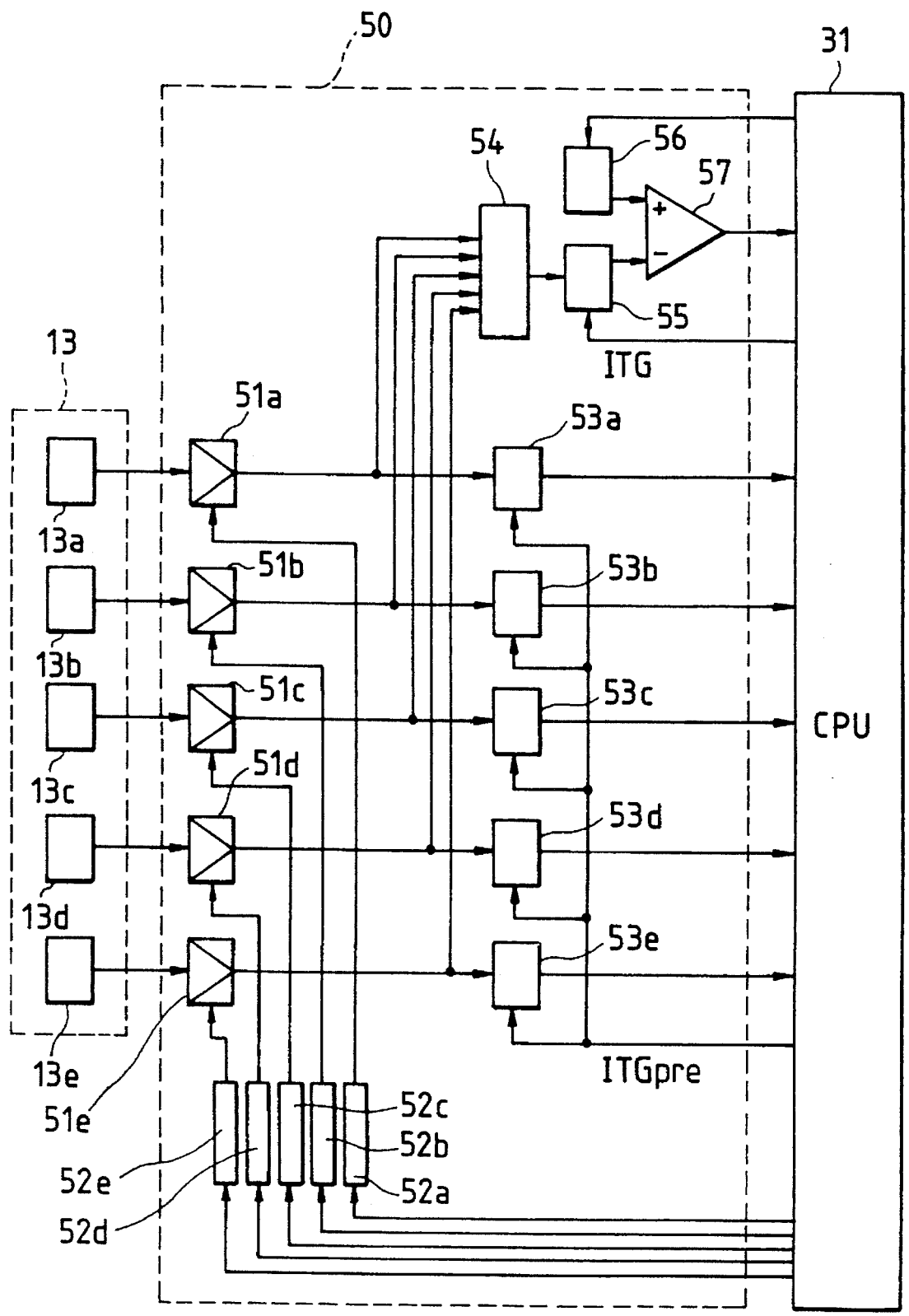
FIG. 5 is a detailed view showing a light adjustment circuit.

FIG. 5 is a detailed circuit diagram showing the light adjustment circuit 50 described above. The light adjustment circuit 50 has amplifiers 51a to 51e for amplifying the output from each of the segmented light receiving elements 13a to 13e, and gain setters 52a to 52e for setting the amplification factor of each of the amplifiers 51a to 51e in response to the instruction from the CPU 31. The gain setters 52a to 52e include D/A converters to convert digital signals from the CPU 31 into analogue signals.

Also, there are provided integration circuits 53a to 53e for integrating the output of each of the amplifiers 51a to 51e at the time of the above-mentioned preliminary flashing by times, respectively, in response to the instruction from the CPU 31, an adder circuit 54 for adding the output of each of the amplifiers 51a to 51e at the time of the regular flashing, an integration circuit 55 for integrating the results of additions of the adder circuit 54 by times in response to the instruction from the CPU 31, a conversion circuit 56 for converting the light adjustment level (which will be described later) stored in advance in the CPU 31 as analogue signals into digital signals, and a comparator 57 which compares the converted light adjustment level and the output of the above-mentioned integration circuit 55 and outputs a flash stopping signal when the output of the integration circuit 55 arrives at the above-mentioned light adjustment level.

Subsequently, in accordance with flowcharts shown in FIG. 6 to FIG. 22 and FIG. 25 to FIG. 28, the procedures for the CPU 31 to control a flash photography will be described.

Figure 6:
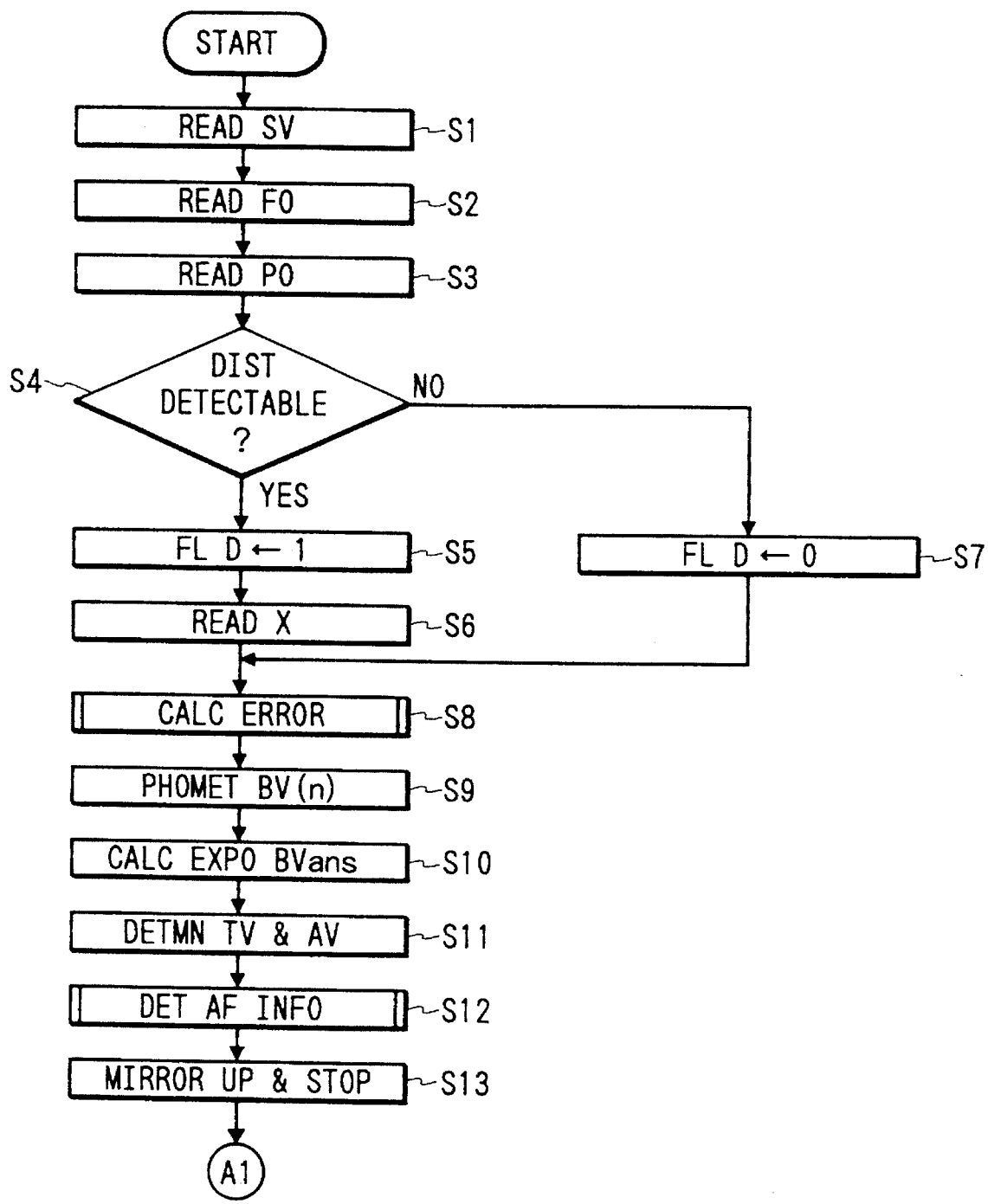
FIG. 6 is a main flowchart illustrating the procedures on a flash photography control.
Figure 7:
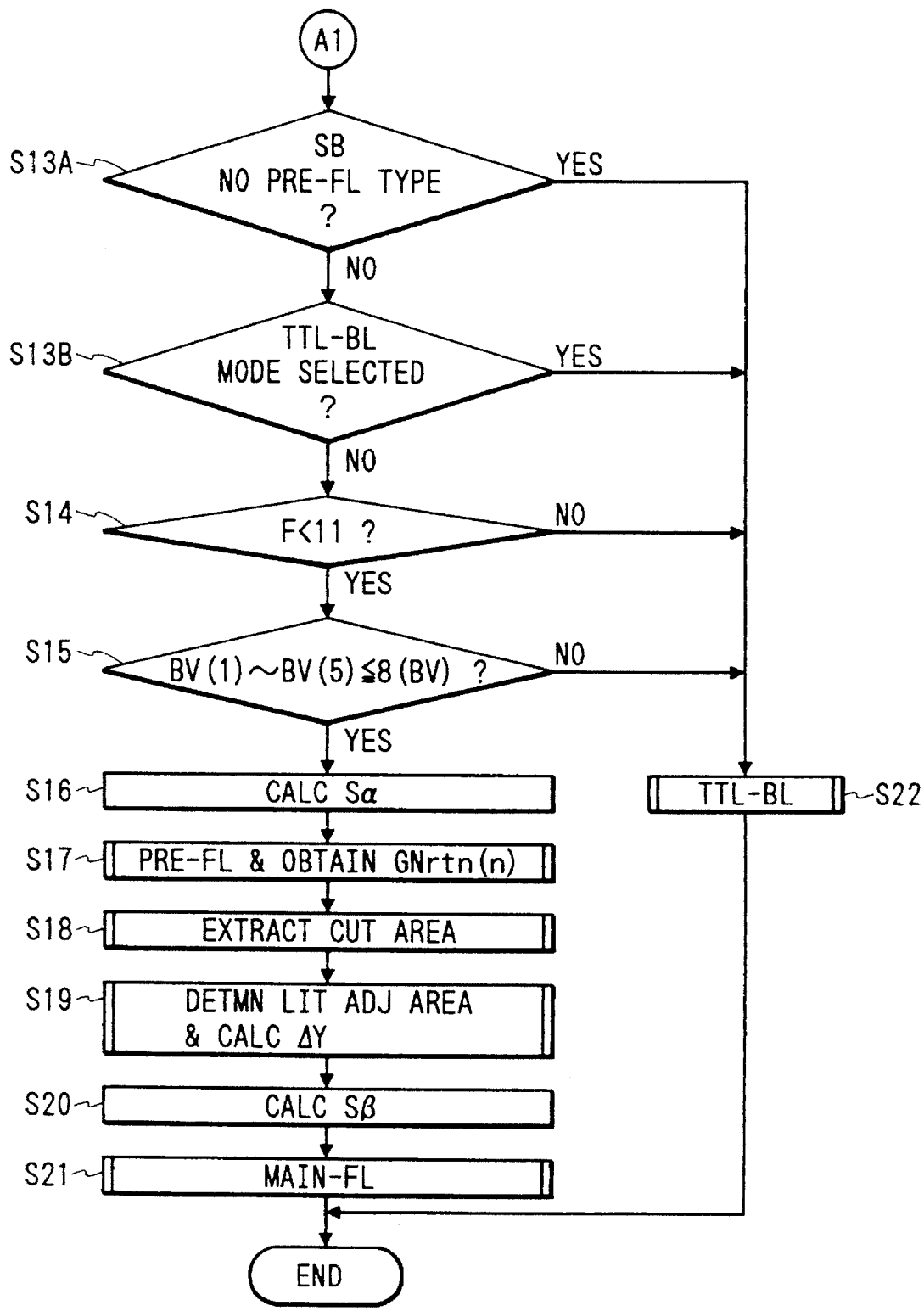
FIG. 7 is a flowchart continued from FIG. 6.

FIG. 6 and FIG. 7 show main flowcharts, and the processes in step S1 and on will be started when the release button 32 (FIG. 4) is fully released subsequent to the half depression operation thereof. At first, in the step S1, the ISO sensitivity SV of a loaded film FI is read by the ISO sensitivity detection circuit 37. Then, in step S2, the release stop value $F_0$ is read from the lens information output circuit 33 in the photographic lens 2, and in step S3, the exit pupil distance PO is read, respectively.

In step S4, whether a distance detection is possible or not is determined. For example, if the photographic lens 2 has an incorporated metering encoder 34 as shown in FIG. 4, the distance detection is possible. In such a case 1, is assigned to the flag FLD in step S5. If no metering encoder is incorporated in the photographic lens 2, any distance detection cannot be performed. In such a case, 0 is assigned to the flag FLD in step S7. After the step S5, the object distance X which is a detection result of the encoder 34 is read through the lens information output circuit 33 in step S6. Then the process will proceed to step S8. Also, subsequent to the step S7, the process will proceed to step S8 directly.

In the step S8, errors are calculated. The results are used when the proposed Hi and Lo cuts are extracted as described later. The errors are briefly classified as a detection error of the object distance and an error due to the preliminary flashing by the flash apparatus. The detection error of the object distance is further divided into the following:

(1) An error due to a lens barrel when the object distance is detected.

(2) An error due to the focusing conducted by the body when the object distance is detected.

The details of these processes will be described later in conjunction with FIG. 8 and FIG. 9.

In step S9, a photometry is conducted by a stationary light. In other words, the outputs of the above-mentioned five segmented photometric elements 8a to 8e (FIG. 4) are drawn into the photometric circuit 36. Then, by this photometric circuit 36, the luminance value BV (n) (n=1 to 5) logarithmically compressed for each of the photometric areas is read. Here, the n values 1 to 5 in the present embodiment are assumed to match the five photometric elements 8a to 8e or segmented light receiving elements 13a to 13e, respectively. Then, in step S10, the stationary light exposure BVans is calculated in accordance with each of the luminance values BV(n) and ISO sensitivity SV which have been read. For this calculation, a method such as disclosed by the applicant hereof in FIG. 7 of Japanese Patent Laid-Open Application No. 1-285925, which is a counterpart of U.S. Pat. No. 4,965,620 issued Oct. 23, 1990, can be used, for example.

Then, the process will proceed to step S11 to determine a shutter speed TV and iris stop value AV in accordance with the calculated stationary light exposure BVans by the known program diagram and then proceed to step S12.

In the step S12, information regarding the focus adjustment is detected. Specifically, this information regards two events, that is, the focus adjustment mode and the focusing state. The focus adjustment mode means those modes mentioned above; the continuance AF mode, single AF mode, and manual mode. The focusing state means a condition of defocus amount. The details thereof will be described in conjunction with FIG. 10. Now, in step S13, the mirror 3 is elevated from the position indicated by the broken line in FIG. 2 to the position indicated by the solid line and at the same time, the iris 9 is stopped down to the stop value AV determined in the step S11. Then the process will proceed to step S13A shown in FIG. 7.

In the step S13A to step S15, whether the process should proceed to executing an algorithm for preliminary flashing or not is determined. In the step S13A, whether the mounted electronic flash apparatus 11 is capable of triggering any preliminary flash or not is discriminated. If affirmative, the process will proceed to step S13B, and if negative, to step S22. This discrimination is made by communications between the body and the electronic flash apparatus 11. Also, in the step S13B, if it is found that the TTL-BL mode has been selected by an external selection switch which is not shown, the process will proceed to the step S22 and if not, to step S14.

In the step S14, if the stop value AV determined in the above-mentioned step S11 is found darker than a predetermined stop value (in the present embodiment, F value is 11 or more), the probability is high that any preliminary flash of a small amount of light can hardly be triggered. Therefore, the process will proceed to the step S22 without conducting any preliminary flashing. Also, in step S15, if the stationary light is found sufficiently bright (here, the BV(1) to BV(5) are all found to exceed 8 (EV)), the preliminary flash is covered with the stationary light. Therefore, in this case, no preliminary flashing is conducted. The process will proceed to the step S22. Otherwise, the process will proceed to step S16. In the step S22, a TTL-BL light adjustment is executed without any preliminary flashing to complete the process. This TTL-BL light adjustment processing will be described later in detail using FIG. 25 to FIG. 28.

In the step S16, on the basis of the released stop value $F_0$ of the photographic lens obtained in the step S2 and the exit pupil distance PO of the photographic lens obtained in the step S3, a correction coefficient $S\alpha$ (n) (n=1 to 5) is calculated for each of the photometric areas of the photographic lens at the time of the shutter blade surface reflection photometry (at the time of a preliminary flashing). In other words, since the light receiving conditions of the above-mentioned light receiving elements 13a to 13e are different by the exit pupil distances PO of the photographic lens 2, it is necessary in this step S16 to execute a process for obtaining the above-mentioned lens correction coefficient $S\alpha$ (n) in order to evaluate the photometric signals of all the light receiving elements at one and the same condition. The correction coefficient $S\alpha$ (n) obtained here will be used for the process to conduct a preliminary flashing which will be described later.

Figure 31A:
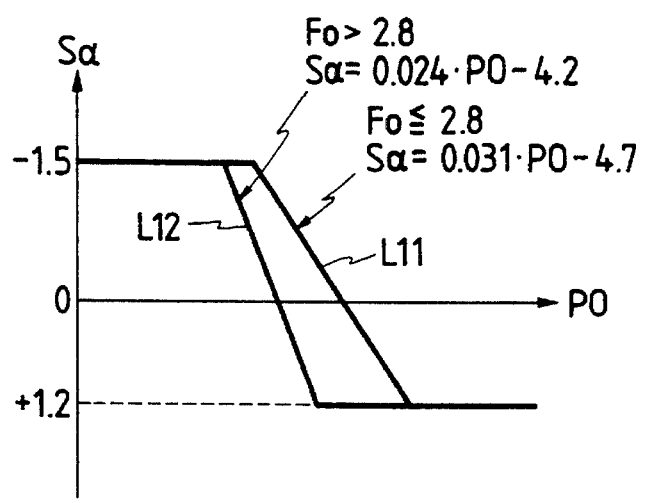
FIGS. 31A, 31B, and 31C are views showing the relationship between the correction coefficient for correcting the photometric output at the time of measuring the reflection of the shutter blade surface photometrically and the distance of the exit pupil of the photographic lens.
Figure 31B:
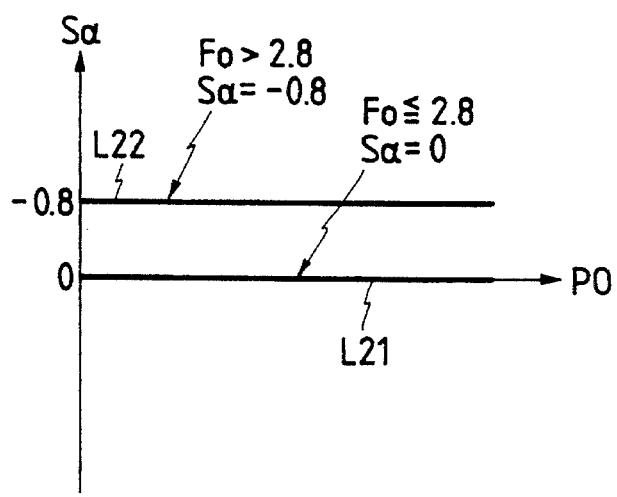
Figure 31C:
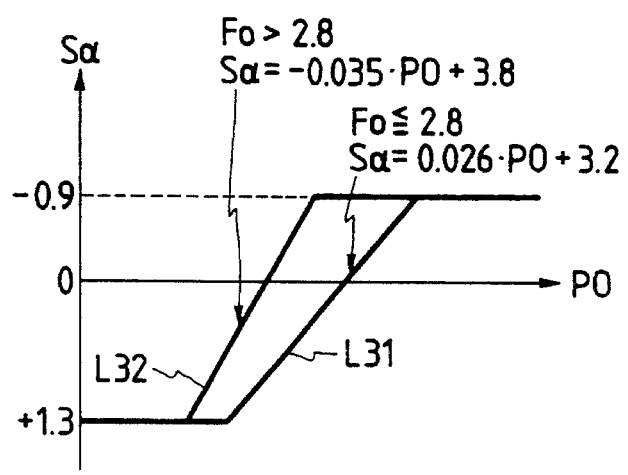

More specifically, both of the correction coefficients $S_\alpha$ (2) and $S\alpha$ (3) of the photometric areas 13b and 13c corresponding to the sky side of the field which is a photographic subject become as shown in FIG. 31A while the correction coefficients $S\alpha$ (1) of the photometric area 13a corresponding to the central portion of the field becomes as shown in FIG. 31B. Also, both of the correction coefficients $S_\alpha$ (4) and $S_\alpha$ (5) of the photometric areas 13d and 13e corresponding to the ground side of the field become as shown in FIG. 31C. Here, for FIG. 31, the exit pupil distances PO are represented on the horizontal axis and the correction coefficients $S\alpha$, on the vertical axis. The characteristics L11, L21, and L31 are shown when the released stop value $F_0$ of the mounted photographic lens is 2.8 or less and the characteristics L12, L22, and L32 are shown when the released stop value $F_0$ is more than 2.8, respectively.

As clear from FIG. 31, whereas the characteristics L21 and L22 of the central portion have constant correction values $S\alpha$ irrespective of the exit pupil distances PO, the characteristics L11 and L12 have the correction coefficients $S_\alpha$ which are greater in the positive side when the exit pupil distance PO is longer than a predetermined value and become greater in the negative side when it is shorter than the predetermined value, both within a specific range. Also, the characteristics L31 and L32 have the correction coefficients $S_\alpha$ which are greater in the negative side when the exit pupil distance PO is longer than a predetermined value and become greater in the positive side when it is shorter than the predetermined value, both within a specific range. This is because in the positional relationship between the photographic lens 2 and light receiving element 13 as shown in FIG. 2, the amount of light received by the light receiving element 13 through the photographic lens and the shutter blade surface is substantially the same irrespective of the exit pupil distances PO, but in the upper part and lower part of the image plane, the amounts of the receiving light are different in the opposite directions depending on the exit pupil distances PO. Further, even if the exit pupil distances PO are the same, the light receiving conditions become different by different stop values F. Therefore, the different characteristics are shown by whether the released stop value $F_0$ is 2.8 or less or not.

In step S17, a preliminary flashing is conducted to effectuate the segmented photometry of the reflection light from the shutter blade surface, and in step S18, an extraction of the proposed photometric areas (cut areas) which do not contribute to the light adjustment at the time of its regular flashing is performed on the basis of the result of the segmented photometry. In step S19, on the basis of the processing result in the step S18, the photometric areas (effective areas) which are allowed to contribute to the light adjustment at the time of the regular flashing are determined and at the same time, the light adjustment correcting value $\Delta Y$ is also determined. The processes in these steps S17 to S19 will be described later in detail in conjunction with FIG. 11 to FIG. 20.

In step S20, on the basis of the released stop value $F_0$ of the photographic lens and exit pupil distance PO, a correction value $S_\beta$ (n) is calculated for each of the photometric areas of the photographic lens at the time of the film plane reflection photometry (at the time of regular flashing). As described above, the light receiving conditions of the above-mentioned light receiving elements 13a to 13e become different depending on the exit pupil distances PO of the photographic lens 2 It is therefore necessary to obtain the above-mentioned lens correction coefficient $S_\beta$ (n) for the evaluation of the photometric signals of all the light receiving elements at one and the same condition. The correction coefficient $S_\beta$ (n) thus obtained here is used for the process required for the regular flashing which will be described later.

Figure 32A:
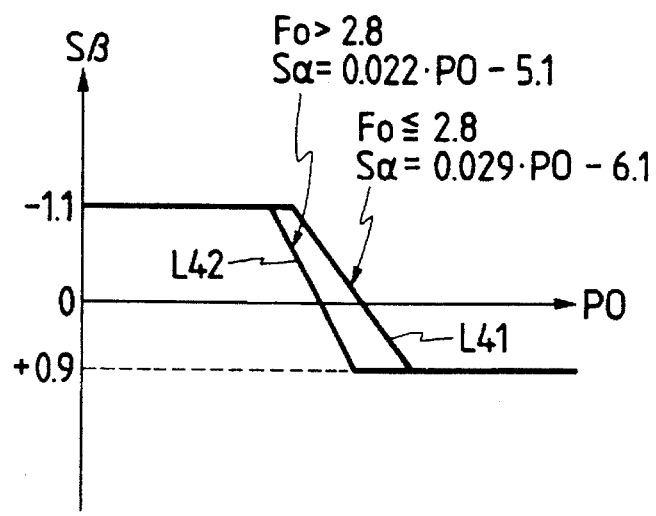
FIGS. 32A, 32B, and 32C are views showing the relationship between the correction coefficient for correcting the photometric output at the time of measuring the reflection of the film plane and the distance of the exit pupil of the photographic lens.
Figure 32B:
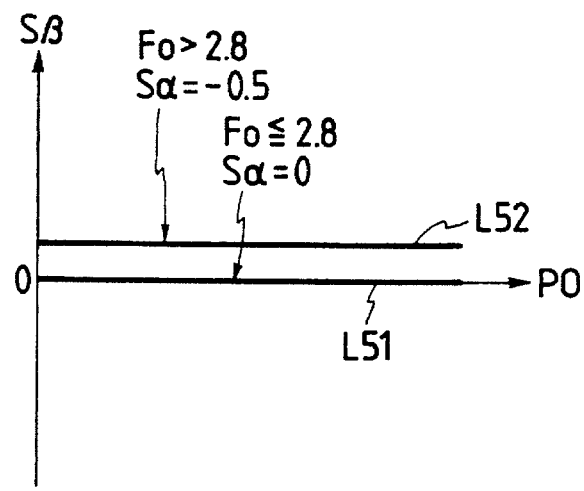
Figure 32C:
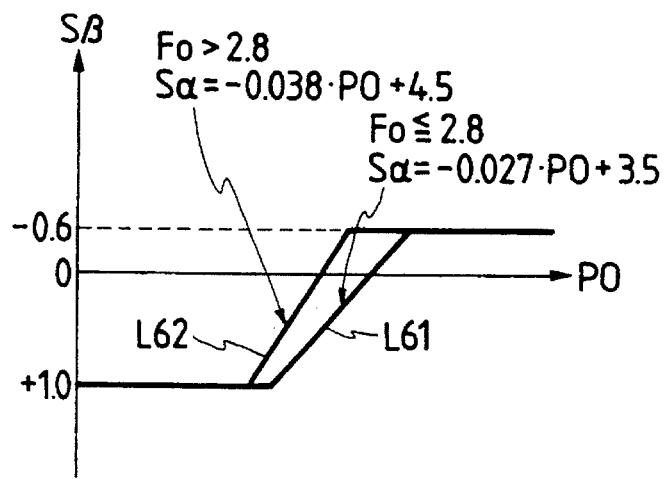

More specifically, both of the correction coefficients $S_\beta$ (2) and $S_\beta$ (3) of the photometric areas 13b and 13c corresponding to the sky side of the field which is a photographic subject become as shown in FIG. 32A while the correction coefficient $S_\beta$ (1) of the photometric area 13a corresponding to the central portion of the field becomes as shown in FIG. 32B. Also, both of the correction coefficients $S\beta$ (4) and $S\beta$ (5) of the photometric areas 13d and 13e corresponding to the ground side of the field become as shown in FIG. 32C. Here, for FIG. 32, the exit pupil distances PO are represented on the horizontal axis and the correction coefficients $S_\beta$, on the vertical axis. The characteristics L41, L51, and L61 are shown when the released stop value $F_0$ of the mounted photographic lens is 2.8 or less and the characteristics L42, L52, and L62 are shown when the released stop value $F_0$ is more than 2.8, respectively.

In other words, the amount of light received by the light receiving element 13 in the central portion of the image plane through the photographic lens 2 and film plane is substantially the same irrespective of the exit pupil distances PO as in the case described above, but in the upper part and lower part of the image plane, the amounts of receiving light are different in the directions opposite to each other depending on the exit pupil distances PO. The characteristics become as shown in FIG. 32. Further, even if the exit pupil distances PO are the same, the light receiving conditions become different depending on the stop value F at that time, the different characteristics are shown whether the released stop value $F_0$ is 2.8 or less or not. In this respect, the values are different from the above-mentioned correction coefficients $S_\alpha$ at the time of the preliminary flashing. This is because of the fact that the positional relationship between the shutter blade surface and film plane is different with respect to the direction of the optical axis.

Now, in step S21, the shutter 10 is fully opened to trigger the regular flash and at the same time, execute the light adjustment operation by conducting the segmented photometry of the reflection light from the film plane. The details of this process will also be described later in conjunction with FIG. 21 and FIG. 22.

Figure 8:
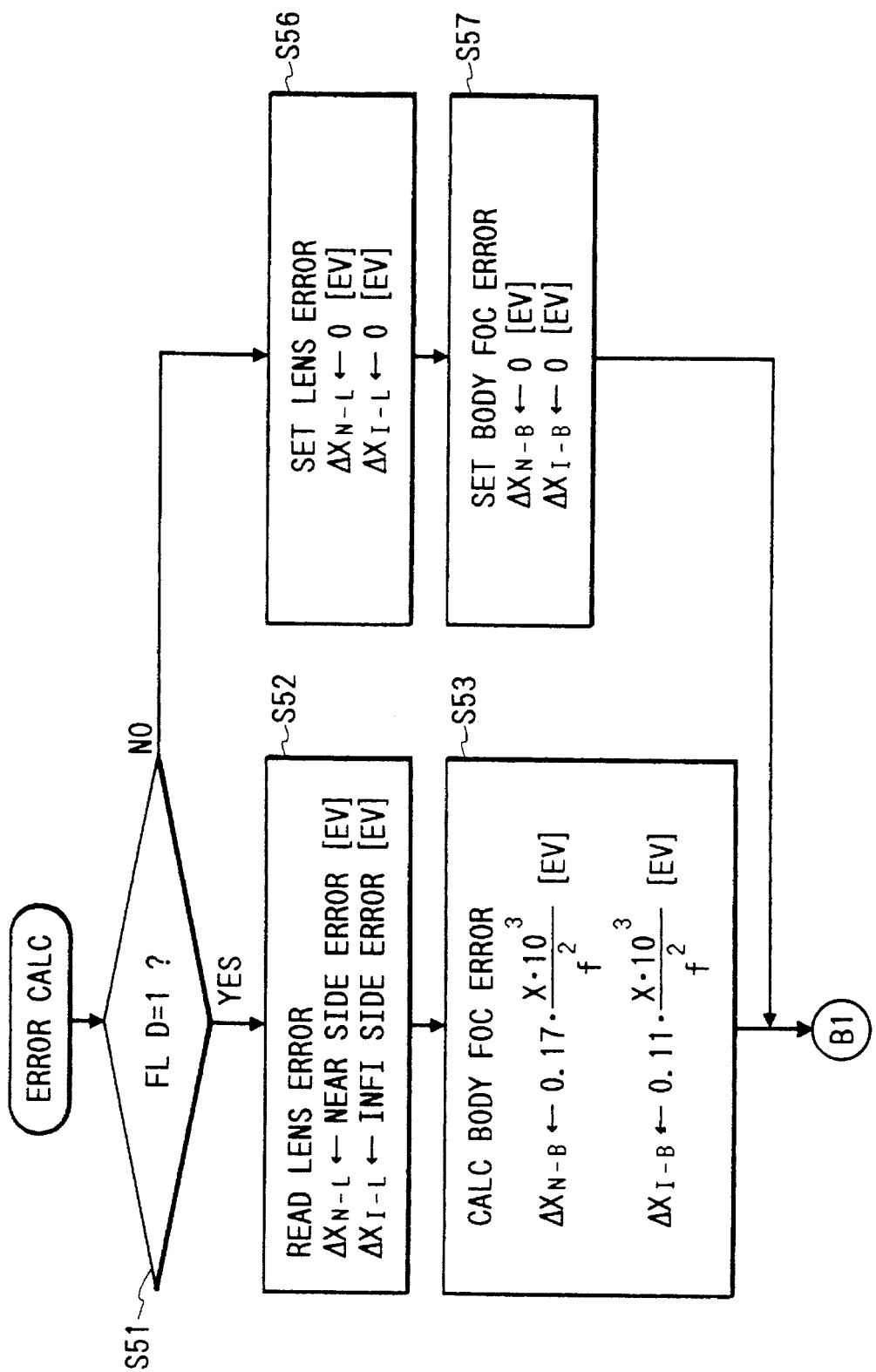
FIG. 8 is a subroutine flowchart showing an error calculation in detail.
Figure 9:
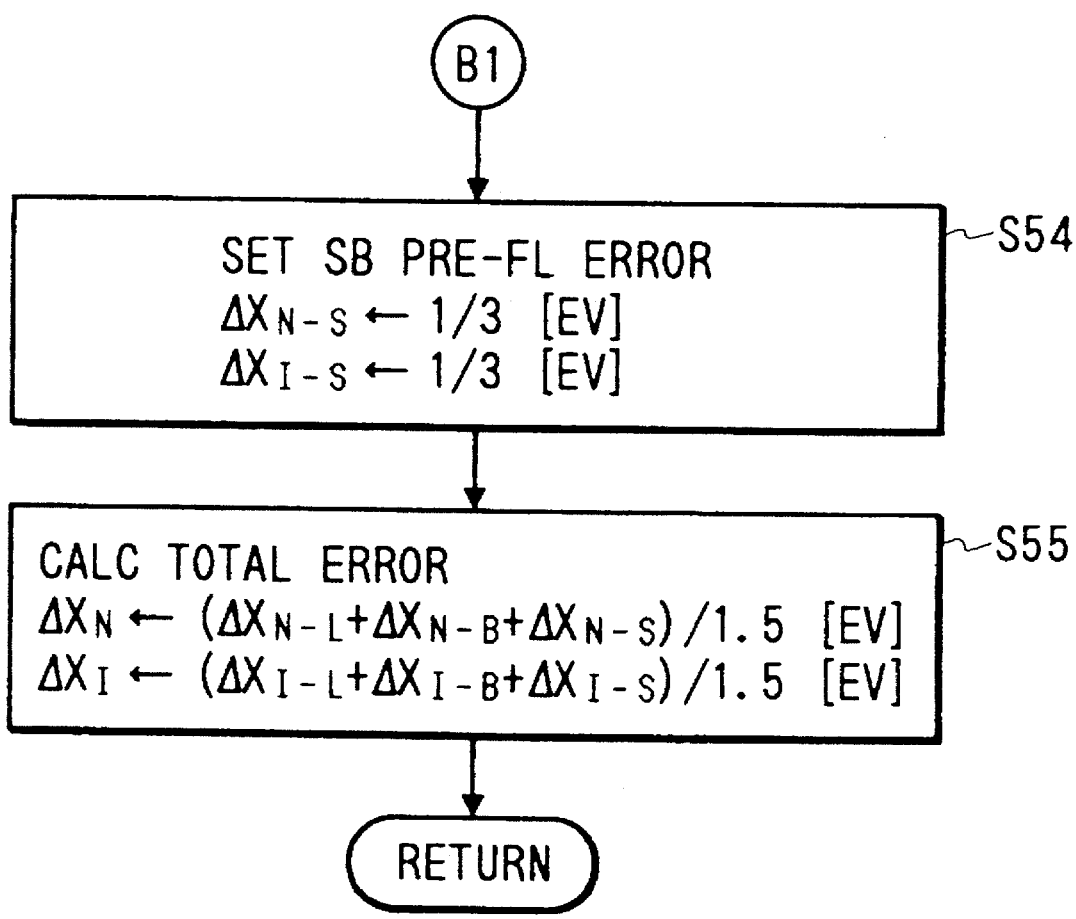
FIG. 9 is a flowchart continued from FIG. 8.

FIG. 8 and FIG. 9 are flowcharts showing the process in the step S8 in FIG. 6, that is, the details of error calculations.

Figure 23:
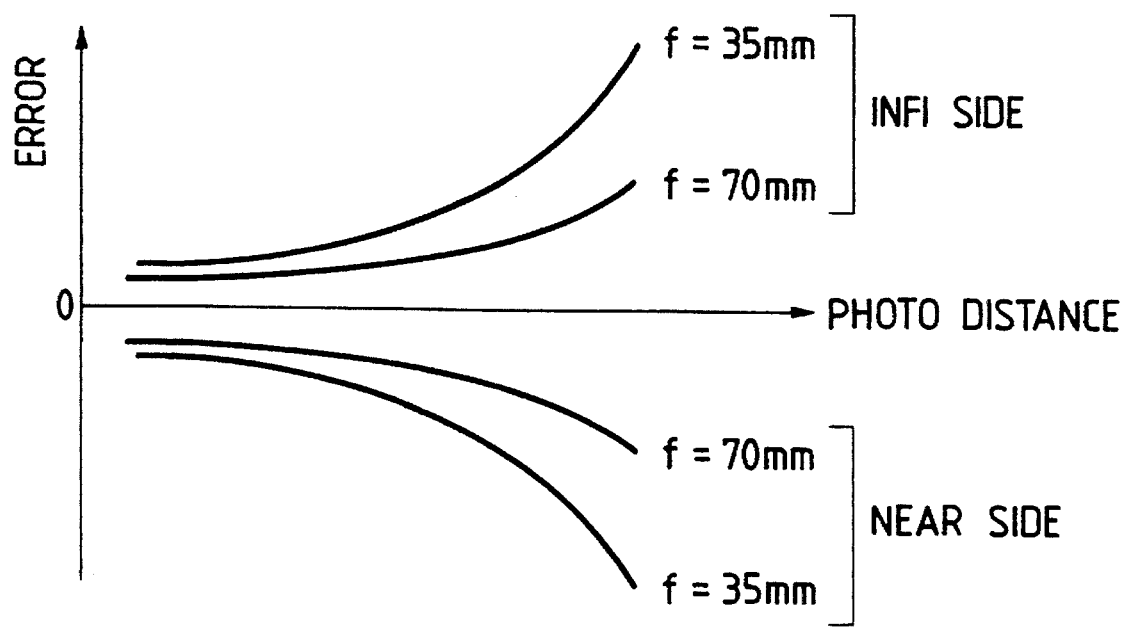
FIG. 23 is a view showing the relationship between the object distance, focal length, and object distance detection error.

In step S51, when the flag FLD=1 is confirmed, that is, the case where the metering encoder is incorporated in the photometric lens 2 to enable distance detections, the process will proceed to step S52. In the step S52, a distance detection error $^\Delta X$ regarding the photographic lens stored in the ROM 35 in the photographic lens 2 is read thorugh the lens information output circuit 33. In this distance error $\Delta X$, there are a near side error $^\Delta X_{N-L}$ and an infinite side error $\Delta X_{I-L}$ respectively for a nominal object distance X, and both of them are assumed to be stored in the lens ROM 35 in advance. The unit is defined as EV. Here, FIG. 23 is a view showing the relations between the object distance X, focal length f, and distance detection error $\Delta X$, in which the farther the object distance is, and the wider the angle of image becomes, the greater becomes the distance detection error. FIG. 24 represents a part of the error data held by the photographic lens 2, which is a table containing the near side error $\Delta X_{N-L}$ and infinite side error $\Delta X_{I-L}$ for the nominal object distance X and focal length at sixteen stages of encoder positions. Here, in FIG. 24, the near side error at the closest object distance (encoder position 16) and the infinite side error at the farthest object distance (encoder position 1) are both 9.9 (the value which can be assumed to be of infinity), and the reason therefor will be described later.

Now, the process will proceed to step S53 to calculate the distance detection error regarding the focusing by the camera body. To simplify the operational expression, an approximation is given as follows:

for the near side error $\Delta X_{N-B}$, $\Delta X_{N-B} = 0.17 \cdot (X \cdot 10^3)/(f^2)$ for the infinite side error $\Delta X_{I-B}$, $\Delta X_{I-B} = 0.11 \cdot (X \cdot 10^3)/(f^2)$ Here, the unit of the focal length f is mm while the unit of the object distance X is m. The unit of error $\Delta X$ is EV. As clear from FIG. 24, the distance detection error regarding the focusing by the body is calculated so that it is proportional to the object distance and inversely proportional to a square of the focal length.

Then, in step S54 in FIG. 9, the error regarding the preliminary flashing of the flash apparatus 11 is set. The setting value for the near side error $\Delta X_{N-S}$ is, $\Delta X_{N-S} = \frac{1}{3}$ The one for infinite side error $\Delta X_{I-S}$ is, $\Delta X_{I-S} = \frac{1}{3}$ Both are a constant value. The unit for the error $\Delta X$ is EV.

In step S55, the total of each of the above-mentioned errors is calculated. In other words, the near side total error $\Delta X_N$ is, $\Delta X_N = (\Delta X_{N-L} + \Delta X_{N-B} + \Delta X_{N-S})/1.5$ The infinite side total error $\Delta X_I$ is, $\Delta X_I = (\Delta X_{I-L} + \Delta X_{I-B} + \Delta X_{I-S})/1.5$ Both are a constant value. The unit for the total error $\Delta X$ is EV.

Subsequently, the process will return to the initial steps shown in FIG. 6.

On the other hand, if the flag FLD is not found to be 1 in the step S51, that is, the case where no distance encoder is incorporated in the photographic lens 2 and any distance detection is impossible, the process will proceed to step S56.

In the step S56, the distance detection error $\Delta X$ regarding the photographic lens is set. In other words, the near side error $\Delta X_{N-L} = 0$ $\Delta X_{N-L} = 0$ The infinite side error $\Delta X_{I-L}$ is, $\Delta X_{I-L} = 0$ In the step S57, the distance detection error $\Delta X$ regarding the focusing by the body is set. In other words, the near side error $\Delta X_{N-B}$ is, $\Delta X_{N-B} = 0$ The infinite side error $\Delta X_{I-B}$ is, $\Delta X_{I-B} = 0$ Then, the process will proceed to step S54.

Figure 10:
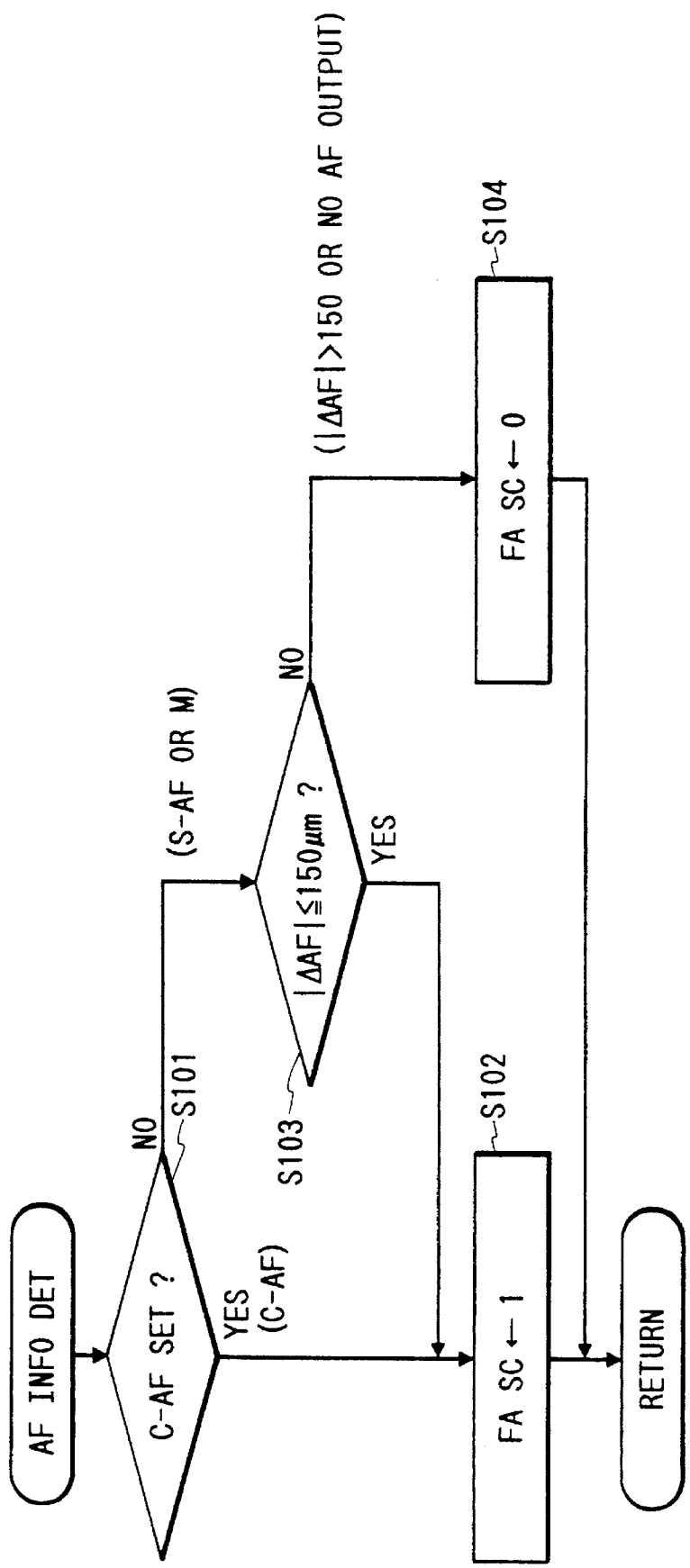
FIG. 10 is a subroutine flowchart showing an AF information detecting process in detail.

FIG. 10 is a flowchart showing the process in the step S12 in FIG. 6, that is, the details of the AF information detection.

At first, in step S101, the discrimination of the focus adjustment modes is performed. If it is found that the above-mentioned C-AF has been set as a focus adjustment mode, the main subject is defined to be overlapped with the focus detecting zone of the image plane (the central portion of the image plane), and the process will proceed to step S102 to assign 1 to the flag FASC. Also, if either S-AF or M has been set, it is not clear whether the main subject is overlapped with the focus detecting zone of the image plane or not. Thus, the process will proceed to step S103 to determine whether or not the absolute value |ΔY| of the defocus amount ΔY immediately before photographing is 150 μm or less. Then, if the |ΔY| is less 150 μm or less, the main subject is assumed to be overlapped with the focus detecting zone, and the process will proceed to step S102 to assign 1 to the flag FASC. Also, if the |ΔY| is not 150 μm or less, the main subject is not assumed to be overlapped with the focus detecting zone or considered unclear. Thus, the process will proceed to step S104 to assign 0 to the flag FASC, and return to the process in FIG. 6.

Figure 11:
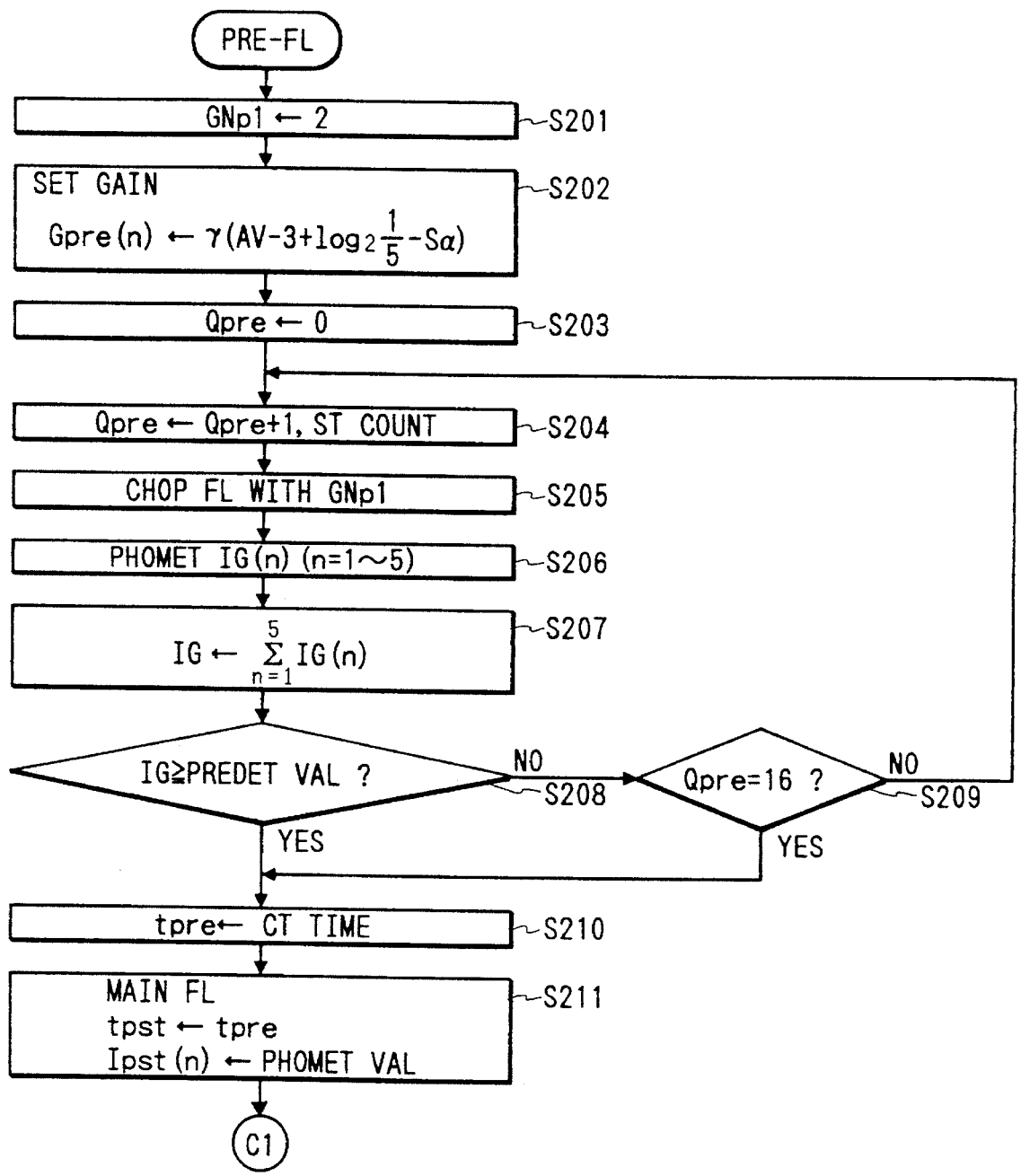
FIG. 11 is a subroutine flowchart showing a photometric process in detail at the time of a preliminary flashing.
Figure 12:
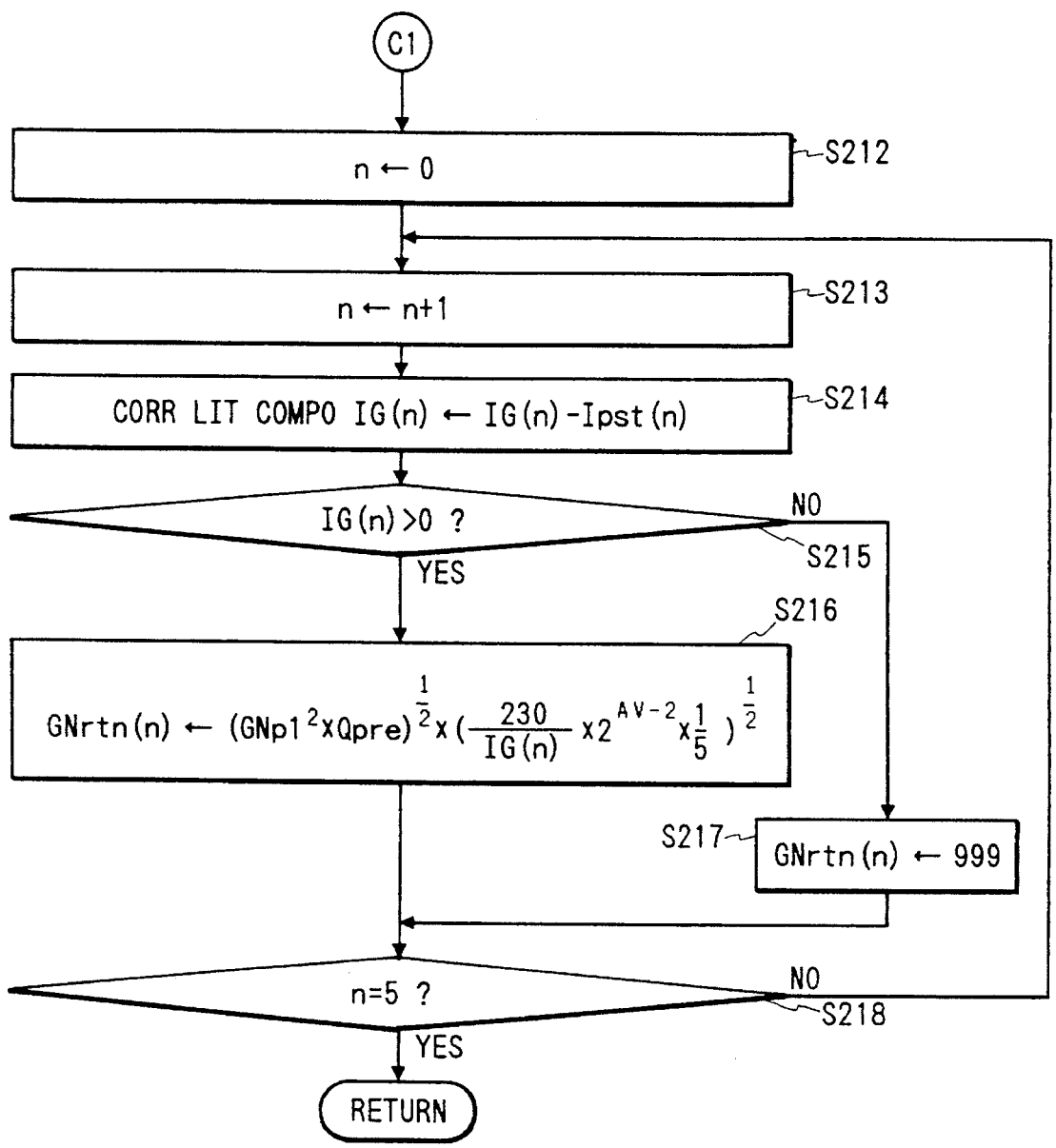
FIG. 12 is a flowchart continued from FIG. 11.

FIG. 11 and FIG. 12 are flowcharts showing the process in the step S17 in the above-mentioned FIG. 7, that is, the details of the preliminary flashing process.

At first, in step S201 in FIG. 11, the guide number GNp1 per preliminary flashing is defined as 2. In other words, chop flash having its guide number 2 as preliminary flash is triggered for several times in the present embodiment. In step S202, using the above-mentioned lens correction coefficient Sα (n) obtained in the step S15, a gain Gpre(n) to be given to the gain setters 52a to 52e (FIG. 5) of the above-mentioned light adjustment circuit 50 is obtained by the following equation:

$Gpre(n) = \gamma(AV - 3 + \log_2(1/5) - S_\alpha(n))$

In step S203, the chop flashing number Qpre is zero reset, and then the Qpre is incremented by 1 in step S204. At the same time, the clocking is started for the photometric time for the preliminary flashing. Then, the process will proceed to step S205. In the step S205, the chop flash is triggered for one time with the above-mentioned guide number GNp1 (GNp1=2) and in step S206, its photometry is executed. In other words, the light beam of the chop flash is reflected by the field to form a primary image on the blade surface of the shutter 10 through the photographic lens 2. This primary image is divided into five, and each of them is received by each of the five segmented light receiving elements 13a to 13e through the condenser lens array 12 shown in FIG. 3. Each of the segmented light receiving elements 13a to 13e inputs the photometric value corresponding to each of the light receiving values sequentially into the amplifiers 51a to 51e of the above-mentioned light adjustment circuit 50.

Each of the amplifiers 51a to 51e amplifies the inputting gain signal respectively with the gain Gpre (n) of each gain setter 52a to 52e (obtained in the step S202) and inputs the amplified value into each integration circuit 53a to 53e. The CPU 31 outputs the operational signal to each of the integration circuits 53a to 53e. Then, the integration circuits 53a to 53e integrate the amplified signals mentioned above by times respectively in response to this operational signal and input them into the CPU 31 as IG (n) (n=1 to 5).

Now, in step S207, the total sum of the five photometric signals IG (n) mentioned above as IG. Then, the process will proceed to step S208. In the step S208, if it is found that the above-mentioned IG is less than a predetermined amount (here, 230), the process will proceed to step S209. Then, if the chop flash number Qpre is found to be less than 16, the process will return to the step S204 to repeat the processes described above. In the step S208, if the IG reaches 230 or in the step S209, the Qpre reaches 16, the process will proceed to step S210. In the step S210, the measured time from the start of clocking n the above-mentioned step S204 is taken as the total photometric time tpre required for conducting the photometry for the preliminary flashing. Then, the process will proceed to step S211.

In the step S211, the photometry of the stationary light is performed by the same optical system which has conducted the preliminary flash. The photometric time tpst at that time is assumed to be the same as the total photometric time tpre. Then, the photometric value of the stationary light obtained here is defined as Ipst (n).

Subsequently, in the steps S212 to S218 shown in FIG. 12, the correction of the stationary light component and GNrtn calculation are performed for the five outputs n=1 to 5. At first in the step S212, zero is assigned to n. Then, in the step S213, n is incremented by 1. In the step S214, a correction is made by subtracting the stationary light component Ipst (n) from the above-mentioned IG (n) which contains the preliminary flash component and stationary light component. Then, the value thus obtained is assigned anew as IG (n), and in the step S215, if the corrected IG (n) is found to be normal, the process will proceed to the step S216 to obtain GNrtn (n) by the following equation:

$$GNrtn(n)=(GNP1_2 \times Qpre)^{1/2} \times [\{230/IG(n)\} \times 2^{\Delta V \cdot 2} \times (1/5)]^{1/2}$$

According to the above equation, the GNrtn (n) becomes a value produced by multiplying a stop value F and object distance X together when the subject in each of the areas has a normal reflection factor. In other words, the area, F·X=GNrtn (n), is considered to have a subject having a normal reflection factor, which is positioned at a distance X. The area, F·X>GNrtn (n), is considered to have an object having a reflection factor higher than the normal reflection factor at a position X. Also, the area, F·X<GNrtn (n), is considered to have an object having a reflection factor lower than the normal reflection factor at a position X. This means that the higher the reflection factor of an object is, the smaller becomes GNrtn (n).

On the other hand, in the step S215, if the IG (n) is not found to be positive, the process will proceed to step S217 to assign an extremely large number (here, 999) to the GNrtn (n) so that it can be regarded as infinity, and then proceed to step S218. In the step S218, if n=5 is found, the process will return to the processes in FIG. 7. Otherwise, it will return to the step S213 to repeat the above-mentioned processes.

Figure 13:
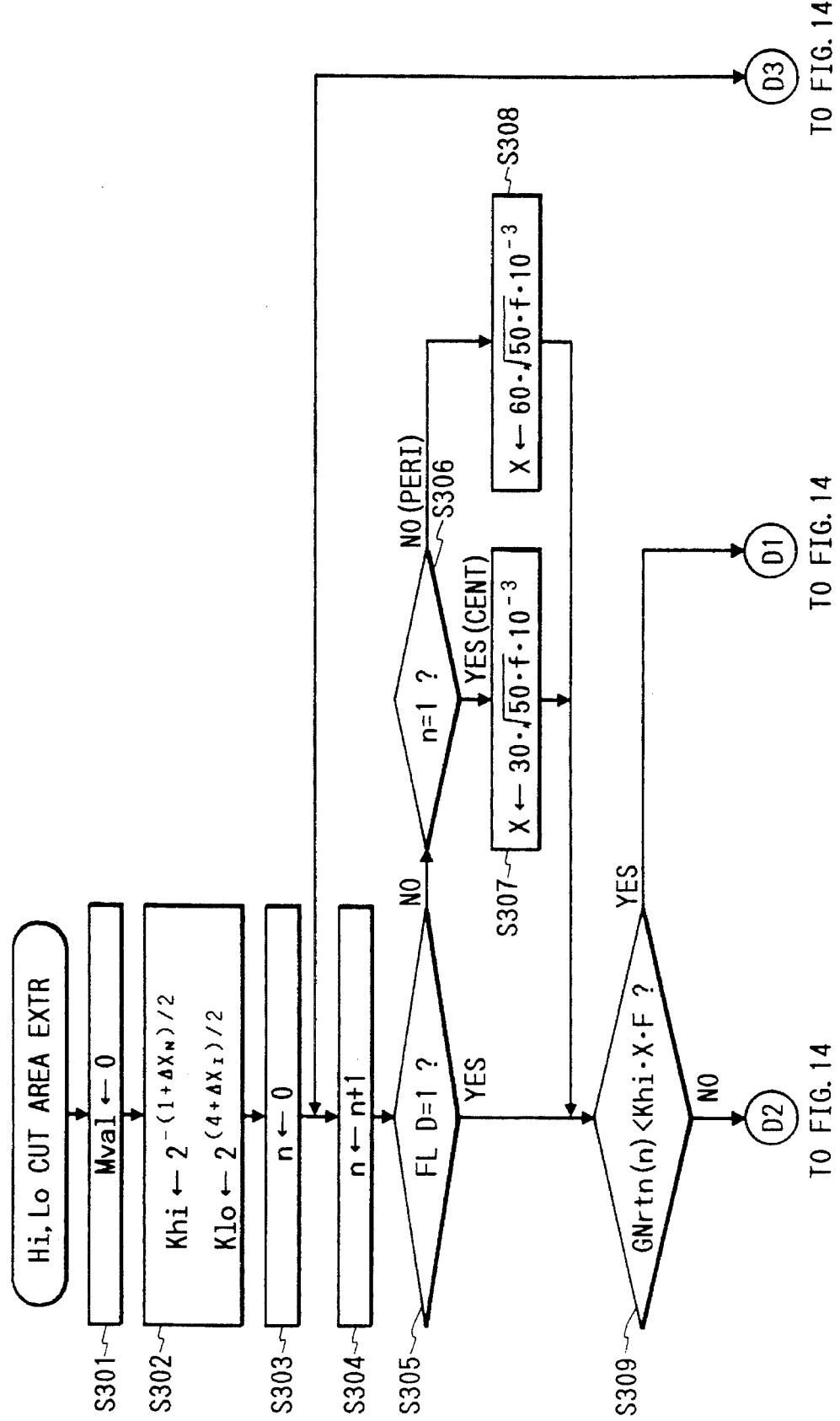
FIG. 13 is a subroutine flowchart showing a proposed cut area extraction process in detail.
Figure 14:
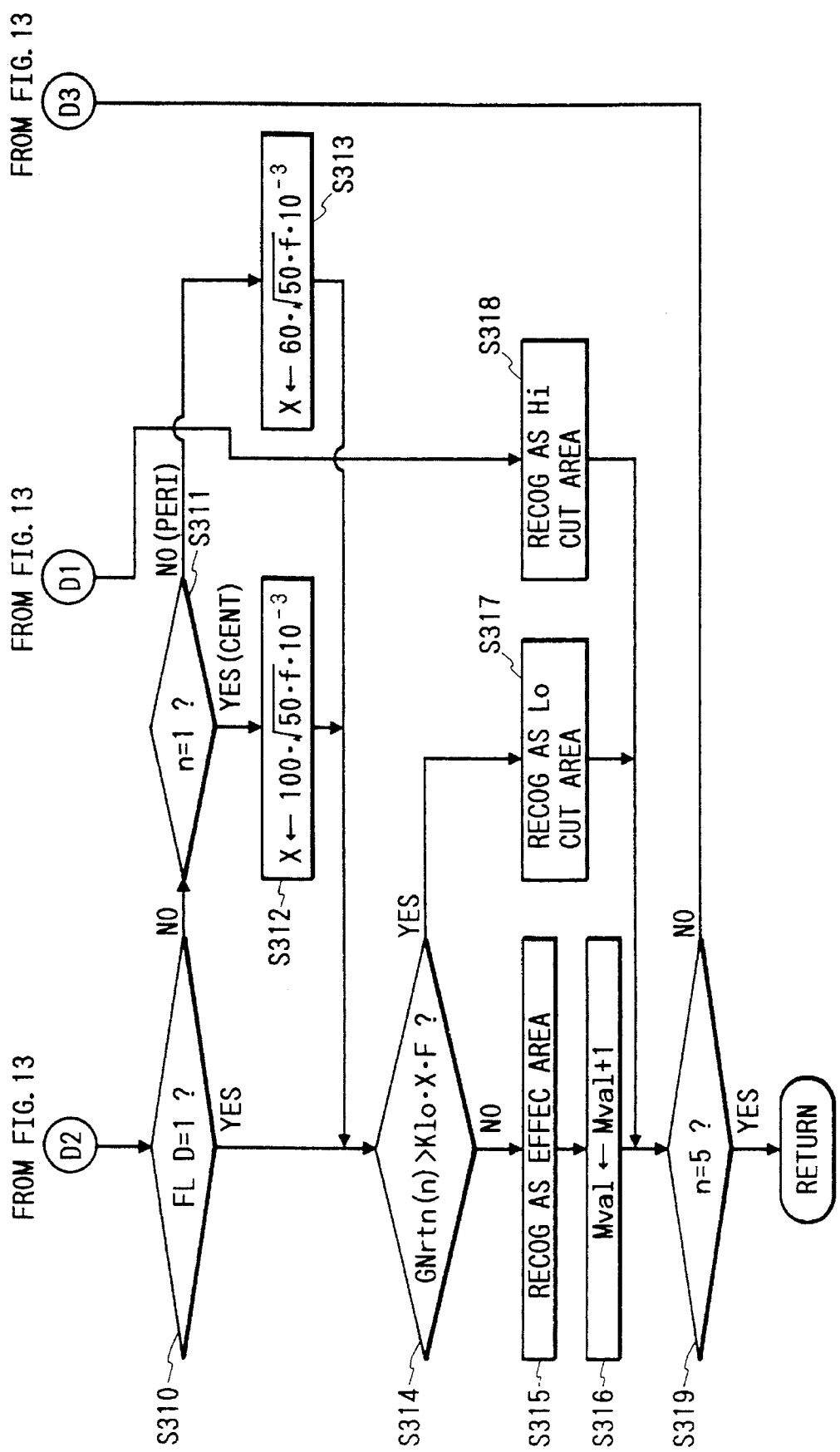
FIG. 14 is a flowchart continued from FIG. 13.

FIG. 13 and FIG. 14 are views showing the details of the proposed Hi and Lo cuts extraction process in the step S18 (FIG. 7).

At first, in step S301, the effective area number Nval is zero reset. In step S302, using the total error obtained in the above-mentioned step S55, the following is assigned to the coefficients Khi and Klo used for the Hi cut and Lo cut which will be described later:

$$Khi=2_{DN}(\text{where } DH=-(1+\Delta X_N)/2)$$

$$Klo=2_{DL}(\text{where } DL=+(4+\Delta X_I)/2)$$

In other words, using the near side error $\Delta X_N$, the coefficient for a Hi cut Khi is calculated and using the infinite side error $\Delta X_I$, the coefficient for an Lo cut Klo is calculated, respectively. Then, according to the above-mentioned expressions, the greater the error $\Delta X_N$ is, the smaller becomes Khi, and also, the greater the error $\Delta X_I$ is, the larger becomes Klo. This is because if the error is greater, the cut coefficients Khi and Klo are defined in the direction for the Hi cut and Lo cut, which will be described later, to become more difficult to be candidates, that is, to become effective areas easily, in order to avoid any disadvantage that the area including the main subject may also be cut off if the detection error regarding the object distance and others is great. For example, if the total errors $\Delta X_N$ and $\Delta X_I$ are both zero, Khi=0.71 and Klo=4, and if the total errors $\Delta X_N$ and $\Delta X_I$ are both 1 EV, Khi=0.5 and Klo=5.66.

Subsequently, in step S303, n is zero reset and at the same time, in step S304, n is incremented by 1. Then, in step S305, whether the flag FLD is 1 or not is examined. Here, if the flag FLD is not 1, it means that any object distance X has been detected. If the step S305 is affirmative, that is, when the object distance X has been detected, the process will proceed to step S309, and if it is negative, to step S306. In the step S306, if the condition n=1 is confirmed, that is, when a calculation is executed for the central portion, the process will proceed to step S307 to assign the following to the object distance X:

$$X=30\cdot(50\cdot f)^{1/2}\cdot 10^{-3}$$

then to step S309. Here, f is a focal length of the photographic lens.

Also, if the n is not 1, that is, when a calculation is executed for the peripheral portion, the process will proceed to step S308 to make the object distance X as follows:

$$X=60\cdot(50\cdot f)^{1/2}\cdot 10^{-2}$$

then to the step S309.

In the step S309, the GNrtn (n) calculated in the above-mentioned step S216 (FIG. 12) is whether $$GNrtn(n)<Khi\cdot X\cdot F$$

or not is examined. If it is negative, the process will proceed to step S310 in FIG. 14, and if affirmative, to S318 in FIG. 14 with an inference that there is an object having a high reflectivity such as a gold screen or mirror in the area or there is a subject (other than the main subject) in the side nearer than the object distance X. Then, after defining such area as a proposed Hi cut area, the the process will proceed to step S319.

In this respect, even if any object distance X cannot be detected, it is determined by the use of the value to be gained in the step S307 or S308 in the step S309 that there is an object having a high reflectivity as far as the value of GNrtn is definitely very small, and such an area is defined to a proposed area for Hi cut. Here, in the steps S307 and S308, it is designed that the value for the step S307 is made smaller. This is because the main subject is more likely to be positioned in the central portion and, therefore, by making the central portion more difficult to be defined as a proposed Hi cut area as compared with the peripheral portion so as to reduce the danger that the main subject in the central portion is cut off.

In step S310, in FIG. 14, whether the flag FLD is 1 or not is again examined. If affirmative, the process will proceed to step S314 and if negative, to step S311. In the step S311, if the condition n=1 is confirmed, that is, when a calculation is executed for the central portion, the process will proceed to step S312 to make the object distance X as follows:

$$X=100 \cdot (50 \cdot f)^{1/2} \cdot 10^{-3}$$

then proceed to step S314. Also, if n is not 1, that is, when a calculation is executed for the peripheral portion, the process will proposed to step S313 to make the object distance X as follows:

$$X=60 \cdot (50 \cdot f)^{1/2} \cdot 10^{-3}$$

then proceed to step S314.

In the step S314, the GNrtn (n) calculated in the above-mentioned step S216 (FIG. 12) is whether $$GNrtn(n) > Klo \cdot X \cdot F$$

or not is determined. If negative, the process will proceed to step S315 and if affirmative, to S317 with an inference that there is an object having a low reflectivity in such area (for example, where no background is missing) and make the area as a proposed Lo cut areas, and then proceed to step S319.

In this respect, even if any object distance X cannot be detected, it is determined by the use of the value to be gained in the step S312 or S313 in the step S314 that there is an object having a low reflectivity as far as the value of GNrtn is definitely very large, and such an area is defined to a proposed area for Lo cut. Here, in the steps S312 and S313, it is designed that the value for the step S312 is made larger. This is because the main subject is more likely to be positioned in the central portion and, therefore, by making the central portion more difficult to be defined as a proposed Lo cut area as compared with the peripheral portion so as to reduce the danger that the main subject in the central portion is cut off.

Also, if the step S309 and step S314 are both negated, such area is proposed to be an effective area and in step S316, the effective area number Mval is incremented by 1 and the process will proceed to step S319. In the step S319, whether n=5 or not is examined, that is, a judgment is made as to whether the above-mentioned processes have been executed for all the areas or not, and if negative, the process will return to the step S304, and if affirmative, return to the processes shown in FIG. 7.

According to the processes in FIG. 13 and FIG. 14, if the GNrtn (n) calculated on the basis of the photometric signals at the time of preliminary flashing for each of the areas is $$GNrtn(n) < Khi \cdot X \cdot F \quad (1)$$

such area becomes a proposed Hi cut area, and if it is $$GNrtn(n) > Klo \cdot X \cdot F \quad (2)$$

such area becomes a proposed Lo cut area, and if it is $$Khi \cdot X \cdot F \leq GNrtn(n) \leq Klo \cdot X31 \cdot F$$

such area becomes a proposed effective area. In other words, the area where the photometric value at the time of preliminary flashing is within a predetermined range becomes a proposed effective area while the area out of the predetermined range becomes a proposed cut area.

Here, there is a possibility that the detected object distance X tends to be a value farther than the actual object distance by the above-mentioned near side error. Consequently, if a judgment should be made in accordance with above-mentioned expression (1) without adding this error, there is a fear that the area for which no Hi cut should be given (the area where the main subject is present) if Hi cut. However, in the present embodiment, the above-mentioned judgment is made by the use of the Hi cut coefficient Khi which becomes smaller as the near side error $\Delta X_N$ becomes greater as described above. Therefore, if the error $\Delta X_N$ is greater, it becomes more difficult for such area to be Hi cut. In other words, it is possible to minimize a disadvantage such as a Hi cut being given to the area where the main subject is present.

Also, there is a possibility that the detected object distance X tends to be a value nearer than the actual object distance by the above-mentioned infinite side error. Consequently, if a judgment should be made in accordance with the above-mentioned expression (1) without adding this error, there is a fear that the area for which no Lo cut should be given (the area where the main subject is present) is Lo cut. However, in the present embodiment, the above-mentioned judgment is made by the use of the Lo cut coefficient Klo which becomes smaller as the infinite side error $\Delta X_I$ becomes greater as described above. Therefore, if the error $\Delta X_I$ is greater, it becomes more difficult for such area to be Lo cut. In other words, it is possible to minimize a disadvantage such as a Lo cut being given to the area where the main subject is present.

Here, the above-mentioned GNrtn (n) is a value corrected by the correction coefficient Sα obtained in accordance with the stop value F of the photographic lens and exit pupil distance PO. Therefore, the above-mentioned Hi cut and Lo cut are performed accurately irrespective of the characteristics of the mounted photographic lens.

In this respect, the near side error for the closest object distance (encoder position 16) and the infinite side error for the fartherest object distance (encoder position 1) are both 9.9 (which is a value regarded as infinity) in the above-mentioned FIG. 24. In this case, therefore, the coefficient Khi of the Hi cut is of an extremely small value and at the same time, the coefficient Klo of the Lo cut is of an extremely large value. When the encoder positions are 1 and 16, the object distance detection error becomes considerably large to make the reliability of detected value extremely low. Hence this measure is needed to protect every area from being cut in consideration of safety.

FIG. 15 to FIG. 20 are views showing the details of the process in the step S19 in FIG. 7.

The process is required to determine the final light adjustment area and obtain the light adjustment correcting value $\Delta Y$. The light adjustment correcting value $\Delta Y$ is a value used for giving a gain for each of the gain setters 52a to 52e of the above-mentioned light adjustment circuit 50 at the time of regular flashing in step S504 in FIG. 21 which will be described later. In a case of $_\Delta Y > 0$, the flashing amount becomes great because the larger the value is, the slower becomes the suspension time of flashing. Also, in a case of $_\Delta Y < 0$, the flashing amount becomes small because the larger the $|_\Delta Y|$ is, the quicker becomes the suspension time of flashing.

Figure 15:
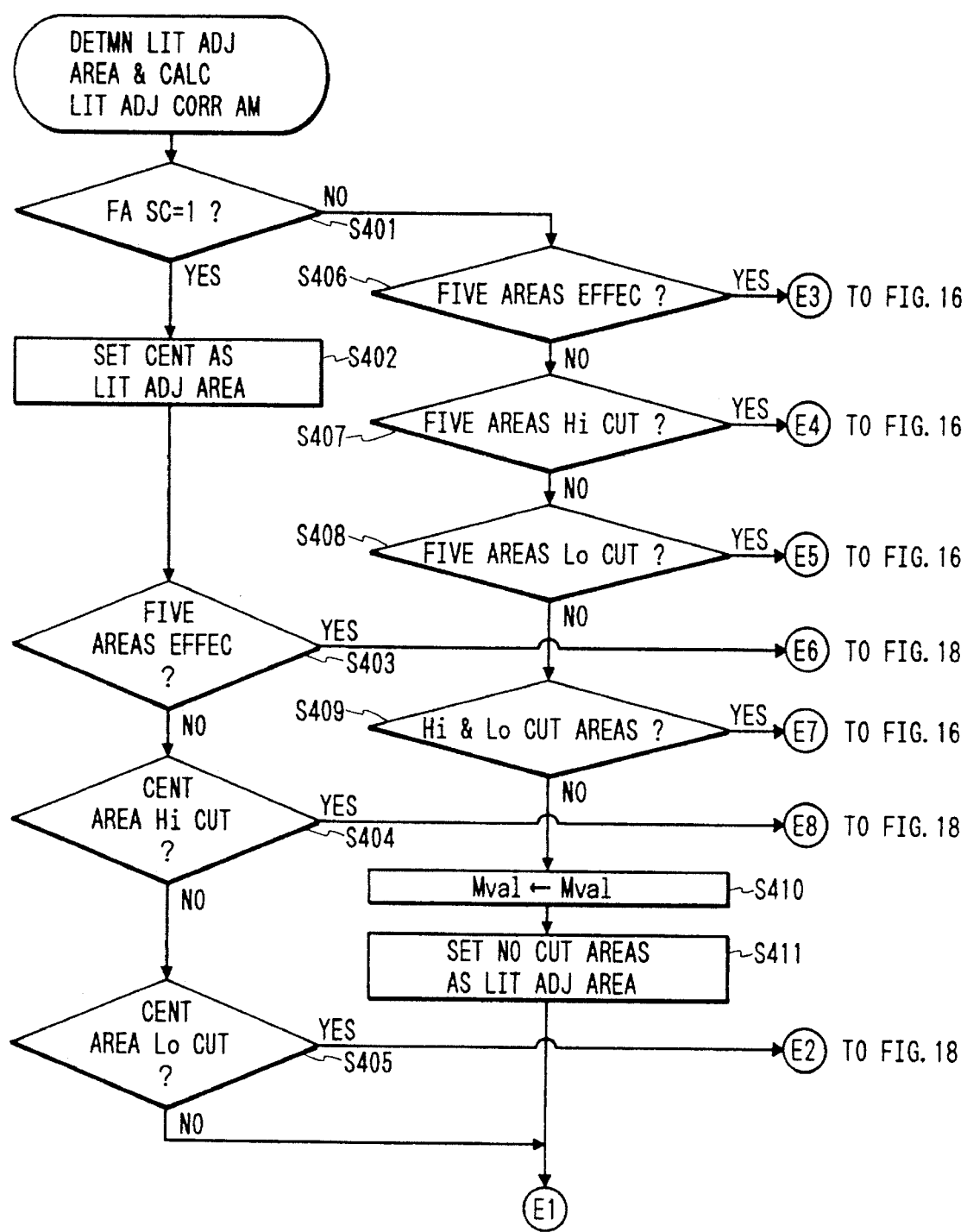
FIG. 15 is a subroutine flowchart showing the processes in detail to determine light adjustment areas and calculate light adjustment correcting amounts.

Fin FIG. 15, whether the above-mentioned flag FASC is 1 or not is examined in step S401. If it is 1, that is, the main subject is conceivably in the center portion of the image plane, the process will proceed to step S402 to set the light adjustment area finally in the central portion, and then to step S403. In the step S403, if it is ascertained that all the five results of judgments in FIG. 13 and FIG. 14 are of effective area candidates, the process will proceed to step S431 in FIG. 18 or otherwise, to step S404. In the step S404, if it is found that the central portion is a proposed Hi cut area, the process will proceed to step S430 in FIG. 18 or otherwise, to step S405. In the step S405, if it is found that the central portion is a proposed Lo cut area, the process will proceed to step S429 in FIG. 18 or otherwise, to step S420 in FIG. 17.

Figure 16:
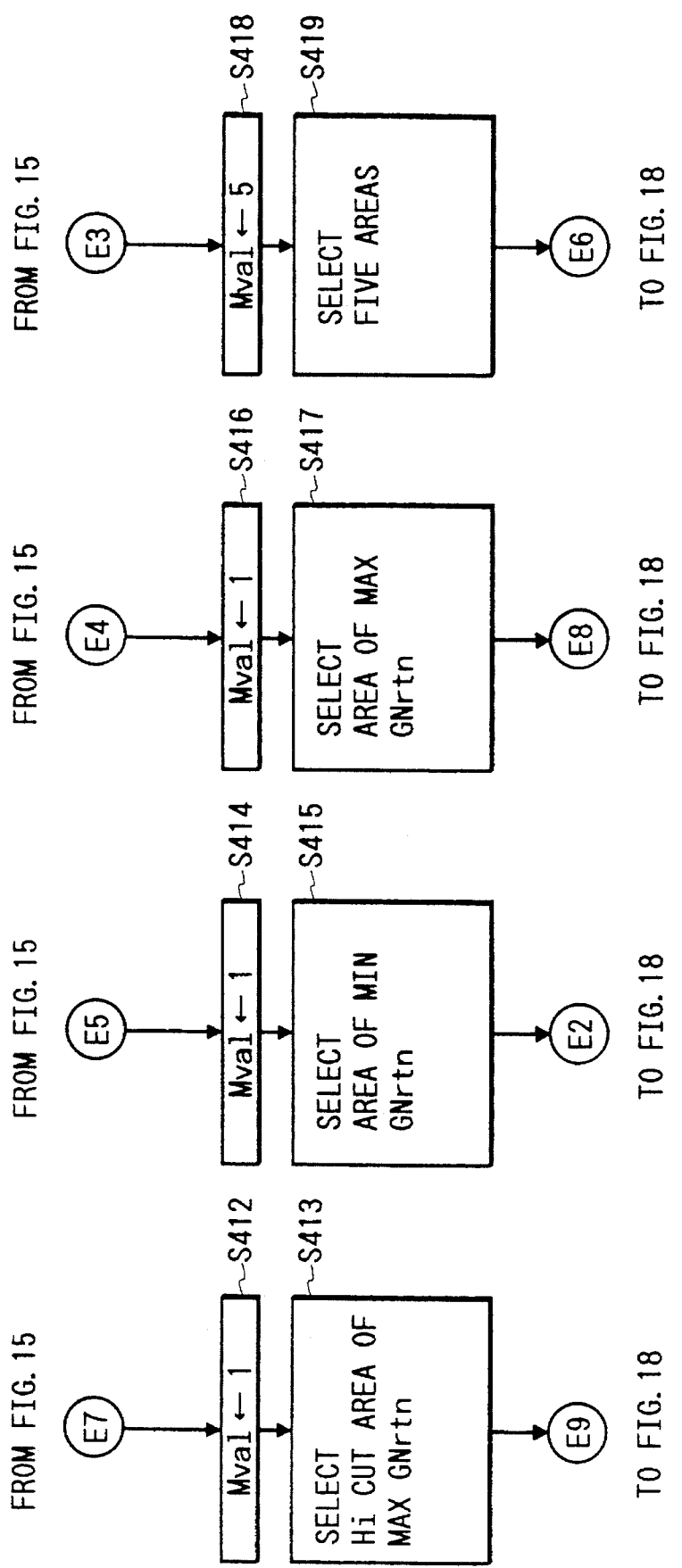
FIG. 16 is a flowchart continued from FIG. 15.
Figure 17:
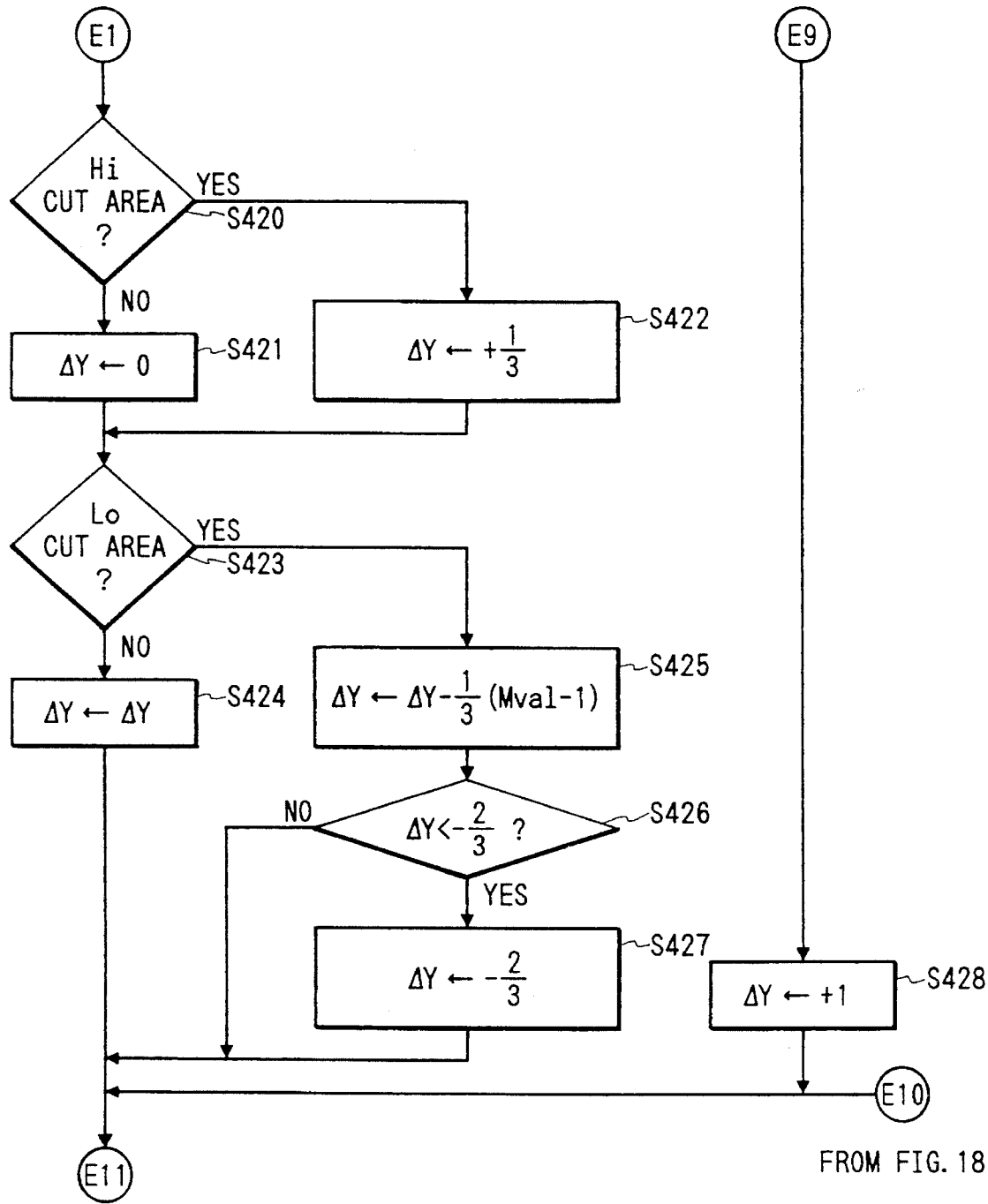
FIG. 17 is a flowchart continued from FIG. 15 and FIG. 16.
Figure 18:
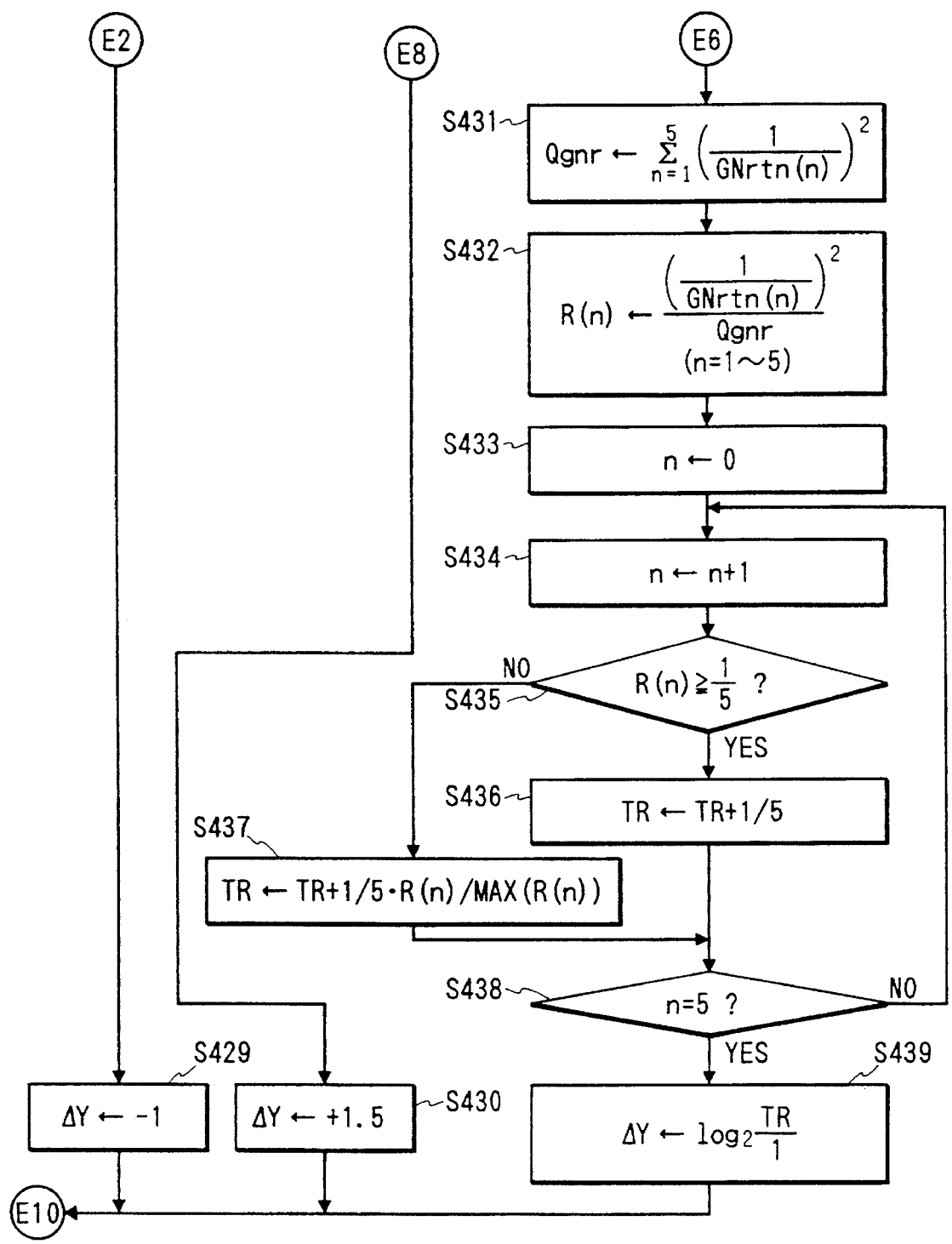
FIG. 18 is a flowchart continued from FIG. 15 and FIG. 16.

On the other hand, in step S401, if the FASC is not found to be 1, that is, there is conceivably no main subject in the central portion, the process will proceed to step S406. The processes in steps S406 to S409 are to find (1) whether all the five areas are proposed as effective areas or not; (2) whether all the five areas are proposed as Hi cut areas or not; (3) whether all the five areas are proposed as Lo cut areas or not; (4) whether all the five areas are proposed as cut areas and there is a mixture of Hi cut and Lo cut areas or not; and (5) whether cut areas and effective areas are mixed or not as results of the processes in the above-mentioned FIG. 13 and FIG. 14. Then, in accordance with the results of these findings the processes given below will be executed;

(1) All the five areas have been proposed as effective areas:

In this case, the step S406 is affirmed, and the process will proceed to step S418 in FIG. 16 to make the effective area number Mval to be five and at the same time, define all the five areas finally as light adjusting areas, and then proceed to step S431 in FIG. 18. In the step S431 the Value Qgnr (total sum of the photometric values at the time of preliminary flashing in the five areas) is calculated by the following equation:

$$Qgnr = \Sigma(1/GNrtn\ (n))^2$$

Her, $\Sigma$ represents the sum total calculation, n=1 to 5. Subsequently, in step S432, the photometric signal distribution R(n) for each of the areas is obtained by the following equation with condition that the total sum of the photometric values for the five areas is 1:

$$R(n) = (1/GNrtn(N))^2/Qgnr$$

where (n=1 to 5)

In step S433, n is zero set, and in steps S434 to S438, the processes are executed to obtain TR on the basis of the distribution R (n) (n=1 to 5) for the five areas. In other words, if the R (n) is 1/5 or more, the 1/5 is added to the last TR to make it a new TR. If the R (n) is less than 1/5, the following is added to the last TR to make it a new TR:

$$TR + (1/5) \times R(n)/MAX\ (R(n))$$

Here, the MAX (R (n)) is the maximum value of R (n). In step S439, using the TR which has been obtained finally as mentioned above, the light adjustment correcting amount $\Delta Y$ is obtained by the following:

$$\Delta Y = \log_2(TR/1)$$

As described above, the light adjustment correcting amount $\Delta Y$ is obtained on the basis of the distribution of the photometric signals for each of the areas. Therefore, it becomes possible to control the suspension time of the regular flashing accurately in the regular flashing processes in FIG. 21 and FIG. 22 which will be described later. Further, the distribution R (n) is calculated using the GNrtn (n) which has been corrected in accordance with the above-mentioned correction coefficient $S_\alpha$ (n). It is therefore possible to obtain an optimal light adjustment correcting amount $\Delta Y$ irrespective of the characteristics of the mounted photographic lens.

(2) All the five areas have been proposed as Hi cut areas:

In this case, when step S407 in FIG. 15 is affirmed, the process will proceed to step S416 in FIG. 16 to assign 1 to the Mval and at the same time, to cause GNrtn (n) to define the largest area finally as a new light adjustment objective area in step S417. That the GNrtn (n) is the largest means that the photometric signal at the time of preliminary is the smallest. In other words, it is the closest to the above-mentioned predetermined region for determining whether the area is a Hi cut area or not, and this area is considered to be an area which receives the smallest influence from an object having a high reflectance. However, if there are a plurality of such areas, a priority is given to the area having a smaller area number. Then proceeding to step S430 in FIG. 18, the process is executed to assign +1.5 to the light adjustment correcting amount $_\Delta Y$. In other words, if the all the areas are proposed as Hi cut areas the adjustment light suspension time is delayed more than usual in order to prevent under exposure.

(3) All the areas have been proposed as Lo cut areas:

In this case, when step S408 in FIG. 15 is affirmed, the process will proceed to step S414 in FIG. 16 to assign 1 to the Mval and at the same time, to cause GNrtn (n) to define the smallest area finally as a new light adjustment objective area in step S415.

That the GNrtn (n) is the smallest means that the photometric signal at the time of preliminary is the largest. In other words, it is the closest to the above-mentioned predetermined region for determining whether the area is a cut area or not, and this area is considered to be an area which receives the smallest influence from the fact that the flash reflection light is not returned. However, if there are a plurality of such areas, a priority is given to the area having a smaller area number. Then, proceeding to step S429 in FIG. 18, the process is executed to assign $-1$ to the light adjustment correcting amount $\Delta Y$. In other words, if the all the areas are proposed as Lo cut areas, the adjustment light suspension time is quickened more than usual in order to prevent over exposure.

(4) All the areas have been proposed as cut areas and there is a mixture of Hi cut and Lo cut areas:

In this case, when step S409 in FIG. 15 is affirmed, the process will proceed to step S412 in FIG. 16 to assign 1 to the Mval and at the same time, to cause GNrtn (n) to define the smallest area finally as a new light adjustment objective area in step S413 as in the case of the above-mentioned (1). Then, further, in step S428, the light adjustment correcting amount $\Delta Y$ is made +1. In other words, the Lo cut candidate area has a missing rear portion where no object exists whereas the Hi cut candidate area should have an object of a high reflectance (a gold screen or mirror, for example) without fail, and it is conceivable that a main subject is covered with this Hi cut candidate area. Therefore, the $_\Delta Y$ is made +1 in order to eliminate both influences from the object having a high reflectance and the object having a low reflectance.

(5) The proposed cut area and effective area are mixed:

In this case, when step S409 in FIG. 15 is negated, the process will proceed to step S410 to set the Mval at the Mval obtained in the above-mentioned step S316 (FIG. 14) and at the same time, to define the effective candidate area as the light adjustment objective area finally in step S411. Subsequently, the process will proceed to step S420 in FIG. 17 to examine whether there is any Hi cut candidate area or not. If there is even one area which has been proposed as a Hi cut area, the light adjustment correcting amount $^\Delta Y$ is made $+\frac{1}{3}$ in step S422. If there is no Hi cut candidate area at all, the $^\Delta Y$ is made zero in step S421. Then, the process will proceed to step S423. In the step S423, whether there is any Lo candidate area or not is examined. If there is any area proposed as a Lo cut area, the correcting amount is made as follows in step S425:

$$\Delta Y=\Delta Y-(\tfrac{1}{3})\times(Mval-1)$$

Then, in steps S426 and S427, a limit of $-\frac{2}{3}$ is given to the $\Delta Y$. If there is no Lo cut candidate area, the $\Delta Y$ at that time is made a new $\Delta Y$ in step S424.

In other words, when a Hi cut candidate area is present, there is an object having a high reflectance as described above, and there is a tendency that even if an adjacent area is not any Hi cut area, such as area is influenced by the high reflective object. Here, therefore, the $\Delta Y$ is made $+\frac{1}{3}$.

Subsequently, the description will be given of the case where there is an area which has been proposed as an Lo cut candidate.

Now, a case where no background scene exists behind the main subject is considered. In this case, the number of effective areas is different depending on whether such a subject is located in the end portion of an image plane or is located in the central portion thereof even when the magnification of the subject is one and the same. In other words, when it is located in the end portion, the number of areas containing the subject becomes less thereby to reduce the effective areas (the areas which are not Lo cut). Also, when the subject is located in the position close to the center of the image plane, the number of areas containing the subject becomes many thereby to increase the effective areas. Then, if the magnification of a subject is one and the same, the effective area, that is, the area occupied by the subject in each of the areas, becomes smaller as the areas containing the subject are more, and the photometric signals at the time of preliminary flashing also become small accordingly. Therefore, in the present embodiment, the $\Delta Y$ is made greater in the minus side when the effective area number Mval is large as indicated in the equation shown in the above-mentioned step S425.

Figure 19:
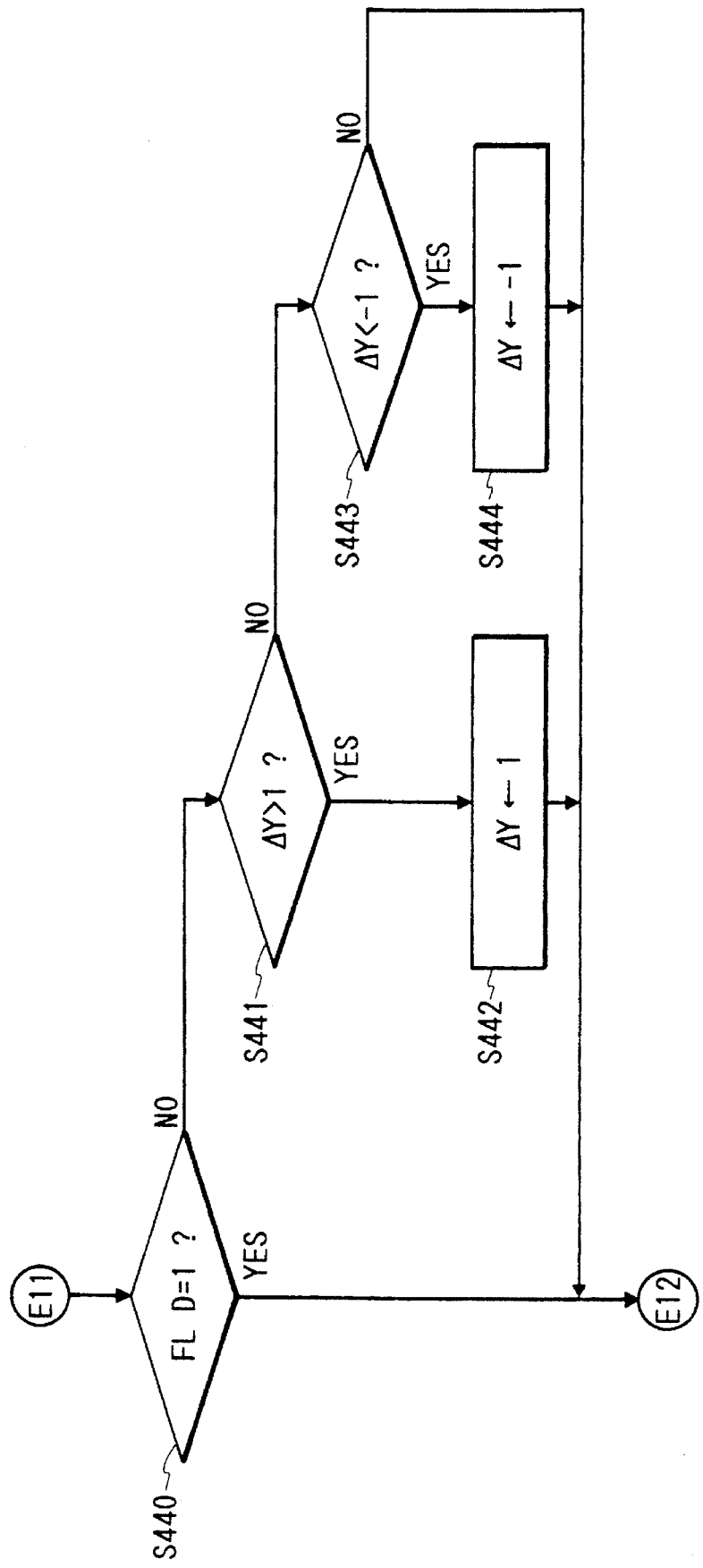
FIG. 19 is a flowchart continued from FIG. 17.
Figure 20:
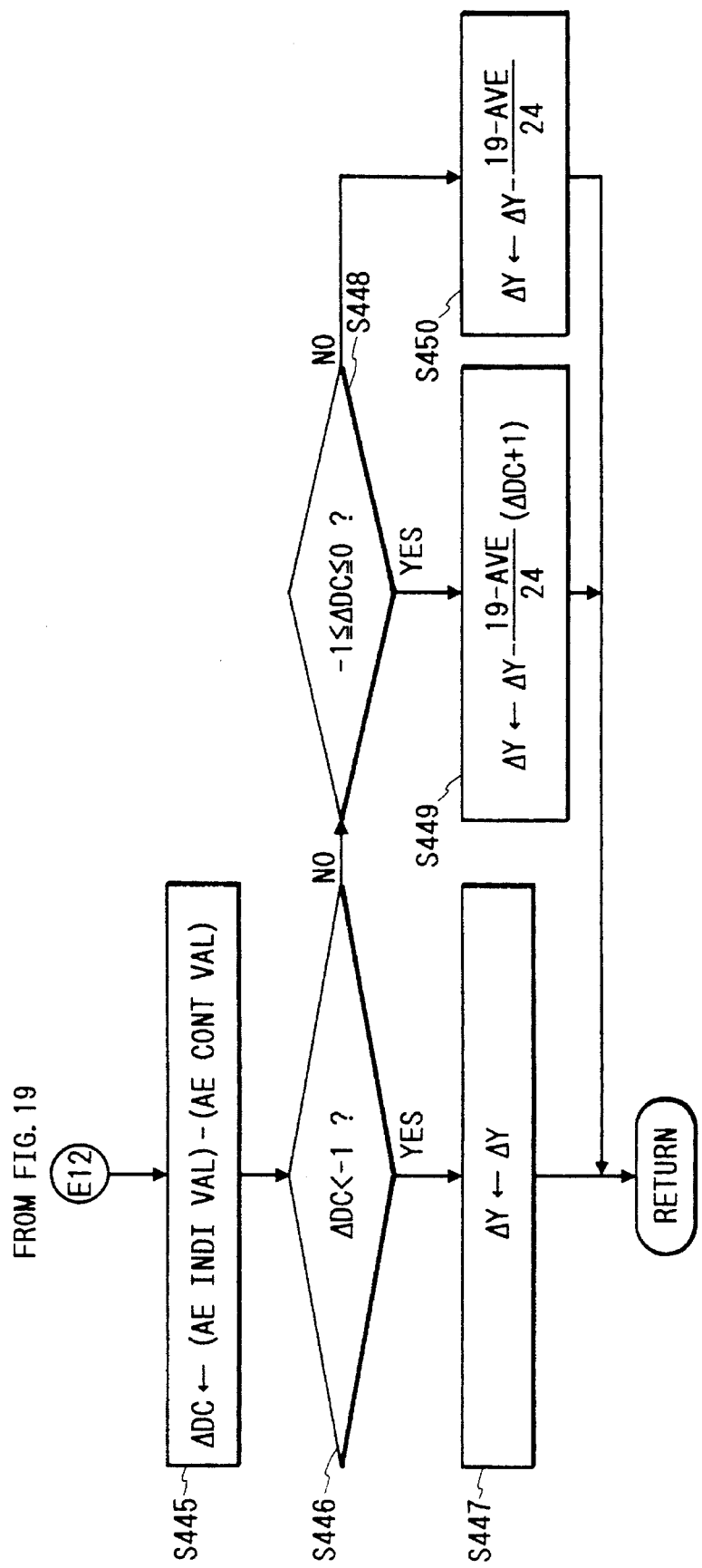
FIG. 20 is a flowchart continued from FIG. 19.

Subsequent to the steps S424, S427, and S428, the process will proceed to step S440 in FIG. 19 to examine whether the flag FLD is 1 or not, and if it is 1, proceed to step S445 in FIG. 20. If it is not 1, any detection of object distance X cannot be executed. Thus, the process will proceed to step S441. Unless an object distance X can be detected, it is not safe to set any large value for $_\Delta Y$. Accordingly, a limit of $-1$ to $+1$ is provided for the $\Delta Y$ which has been calculated as mentioned above in steps S441 to S444.

In step S445 in FIG. 20, from the ideal exposure value of a stationary light calculated by a camera, that is, an AE indication value, an AE control value at which an actual control is executed is subtracted, and the value thus obtained is given as a $\Delta DC$. A case where the $\Delta DC$ is not zero means the case in which a photography is conducted with manual exposure or strobe synchronous seconds have reached a limited value to cause it to be out of the interlocking range, or some others. In steps S446 to S450, the $_\Delta Y$ is corrected again in accordance with the value of $\Delta DC$.

In the step S446, if the $\Delta DC$ is found to be less than $-1$, that is, when the control of the stationary light is conducted by controlling with a value under 1 EV, it is not corrected again and the $\Delta Y$ is defined as it is in the step S447. Also, when the $^\Delta DC$ is $-1 \leq \Delta DC \leq 0$, the correction is made by making the strobe light rather small by the extent to which the stationary light illuminates the main subject in accordance with the following equation:

$$\Delta Y=\Delta Y-((19-AVE)/24)\times(_\Delta DC+1)$$

Here, the AVE represents an average of the five luminances (BV) of the stationary light obtained by the segmented photometric means 8. Therefore, the darker it is and also the greater the $_\Delta DC$ is, the more is the $\Delta Y$ corrected in the minus direction. Further, when the $\Delta DC$ is $0<^\Delta DC$, the same correction is made in accordance with the following equation:

$$\Delta Y=\Delta Y-((19-AVE)/24)$$

Figure 21:
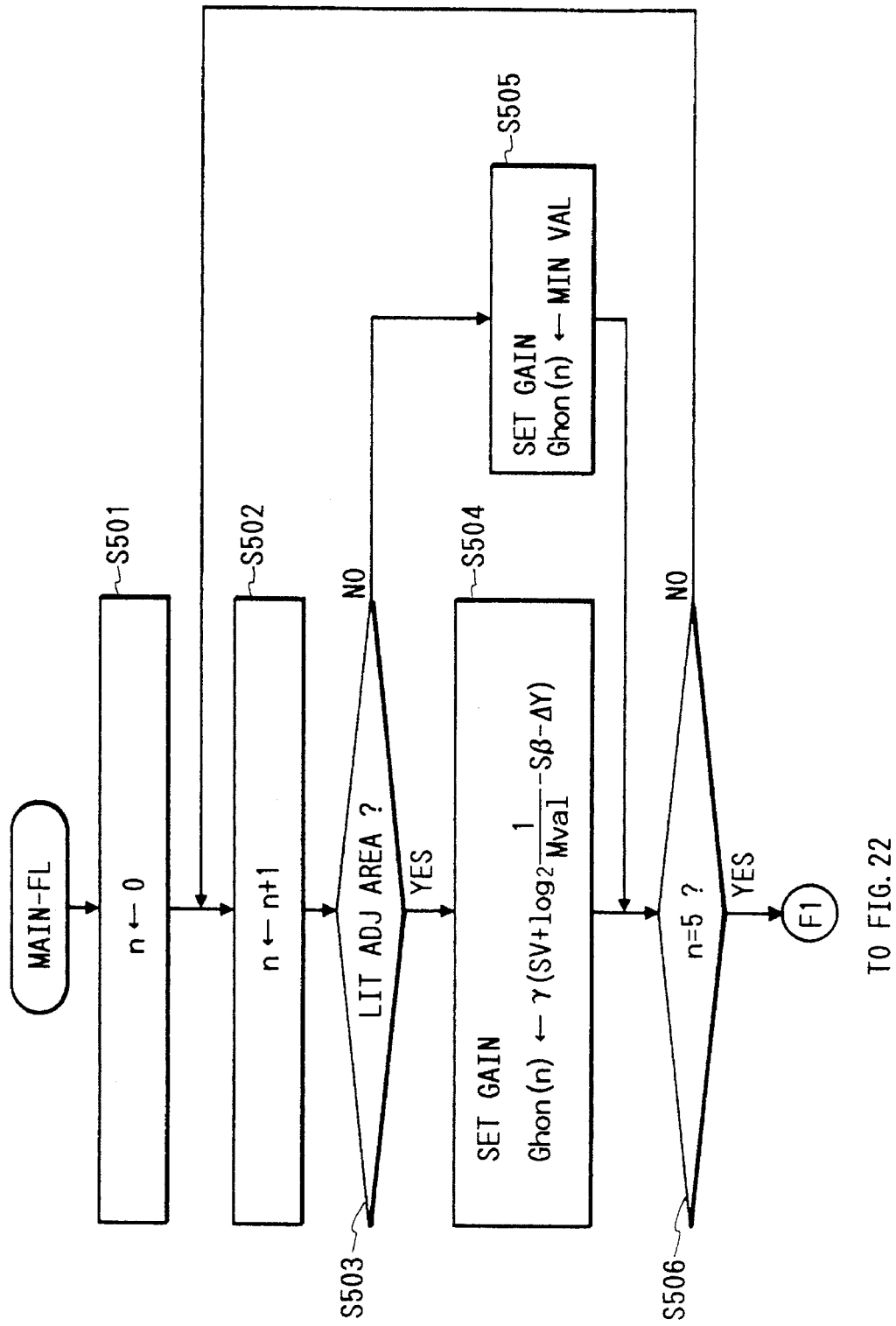
FIG. 21 is a subroutine flowchart showing a light adjustment process in detail at the time of a regular flashing.
Figure 22:
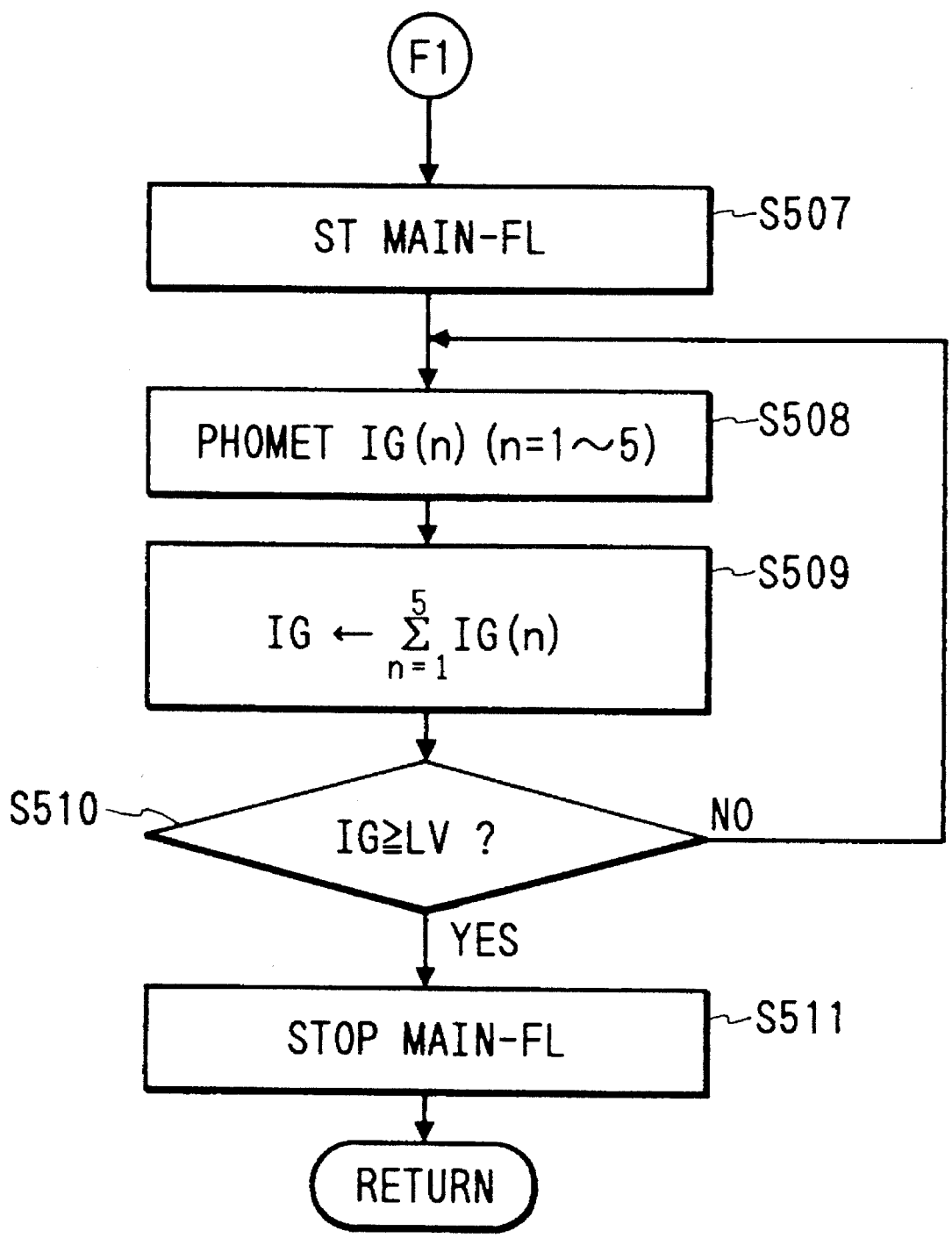
FIG. 22 is a flowchart continued from FIG. 21.

FIG. 21 and FIG. 22 are views showing the details of the regular flashing process in the step S20 in FIG. 7.

In step S501 in FIG. 21, n is zero reset, and then in step S502, the n is incremented by 1 to examine whether the area indicated by n is a light adjustment objective area or not in step S503. If the step S503 is negated, the process will proceed to step S505 to define the gain Ghon (n) given to the gain setters 52a to 52e of the light adjustment circuit 50 to be a value which is sufficiently small ($-10$, for example) and then, proceed to step S506. On the other hand, if the step S503 is affirmed, the Ghon (n) is obtained in step S504 by the following equation using the light adjustment correcting amount $\Delta Y$ obtained in the process described above.

$$Ghon(n)=\gamma(SV+\log_2(1/Mval)-S_\beta-_\Delta Y)$$

Then, the process will proceed to step S506. Here, the SV is a film ISO sensitivity, $S_\beta$ is a lens correction coefficient obtained in the step S19, $\Delta Y$ is a light adjustment correcting amount, and $_\gamma$ is a constant. In step S506, whether n=5 or not is determined, and if it is negated, the process will return to the step S502 to repeat the above-mentioned processes. If affirmed, the process will proceed to step S507 in FIG. 22.

According to the processes hitherto executed, the gains Ghon (1) to Ghon (5) are given to the gain setters 52a to 52e, respectively.

In the step S507, the regular flashing of the electronic flash apparatus 11 is started and in step S508, its photometry is executed. In other words, the illuminated light from the regular flashing is reflected by the subject and reflected by the film plane through the photographic lens 2. Then, the reflected light is received by each of the five light receiving elements 13a to 13e. The photometric signals IG (1) to IG (5) of the light receiving elements 13a to 13e are inputted respectively into the amplifiers 51a to 51e of the light adjustment circuit 50.

The amplifiers 51a to 51e amplify the photometric signals IG (1) to IG (5) by the gains Ghon (1) to Ghon (5) set by the gain setters 52a to 52e and input them into the adder circuit 54. The adder circuit 54 adds the amplified signals thus inputted. The integration circuit 55 integrates by times the results of the addition by the adder circuit 54, that is, the total sum of the amplified photometric signals IG (1) to IG (5) and makes such integrated value as IG (step S509).

On the other hand, the light adjustment level LV which has been set in advance is output to a conversion circuit 56. The conversion circuit 56 converts this into analogue signals. This converted light adjustment level and the output IG of the above-mentioned integration circuit 55 are inputted into a comparator 57. The comparator 57 determines whether the IG has reached the above-mentioned light adjustment level LV or not (step S510). If this is negated the process will return to the step S508. If affirmed, the process will proceed to step S511 to control the flash controlling circuit 38 of the electronic flash apparatus 11 so that the above-mentioned flashing is suspended, and then terminate this processing.

According to the procedures in FIG. 21 and FIG. 22, the gain Ghon (n) is obtained on the basis of the light adjustment correcting amount $^\Delta Y$, and when the $\Delta Y>0$, the flash suspension time for the regular flashing is delayed to make the flashing amount larger if such value is greater. Also, when the $\Delta Y<0$, the flash suspension time for the regular flashing is quickened to make the flashing amount smaller if the $|\Delta Y|$ is greater.

Here, the above-mentioned gain Ghon (n) is a value corrected by the correction coefficient $S_\beta$ obtained from the stop value F and the exit pupil distance PO of the photographic lens, and the photometric value from the light receiving element 13 at the time of regular flashing is weighted on the basis of this gain Ghon (n). Then, when its total sum arrives at a predetermined level, the regular flashing is suspended. Therefore, it is possible to control the suspension time of the regular flashing appropriately irrespective of the characteristics of the photographic lens.

The description has been given of the controlling procedures when a preliminary flashing is conducted. According to the procedures, the photometric areas (effective areas) which contribute to the light adjustment at the time of regular flashing are determined using the photometric value at the time of preliminary flashing, the object distance X inputted from the photographic lens 2, and the object distance detection error $_\Delta X$, and the light adjustment is made using the photometric values of the effective areas when the regular flashing is performed. The areas which contribute to the light adjustment at the time of the regular flashing are determined in this way with an additional consideration of the object distance detection error. Thus making it possible to discriminate accurately the effective areas from the cut areas even when the object distance detection accuracy is not excellent.

Now, using FIG. 25 to FIG. 28, the description will be given of the details of the TTL-BL light adjustment process at the step S24 in FIG. 7.

Figure 25:
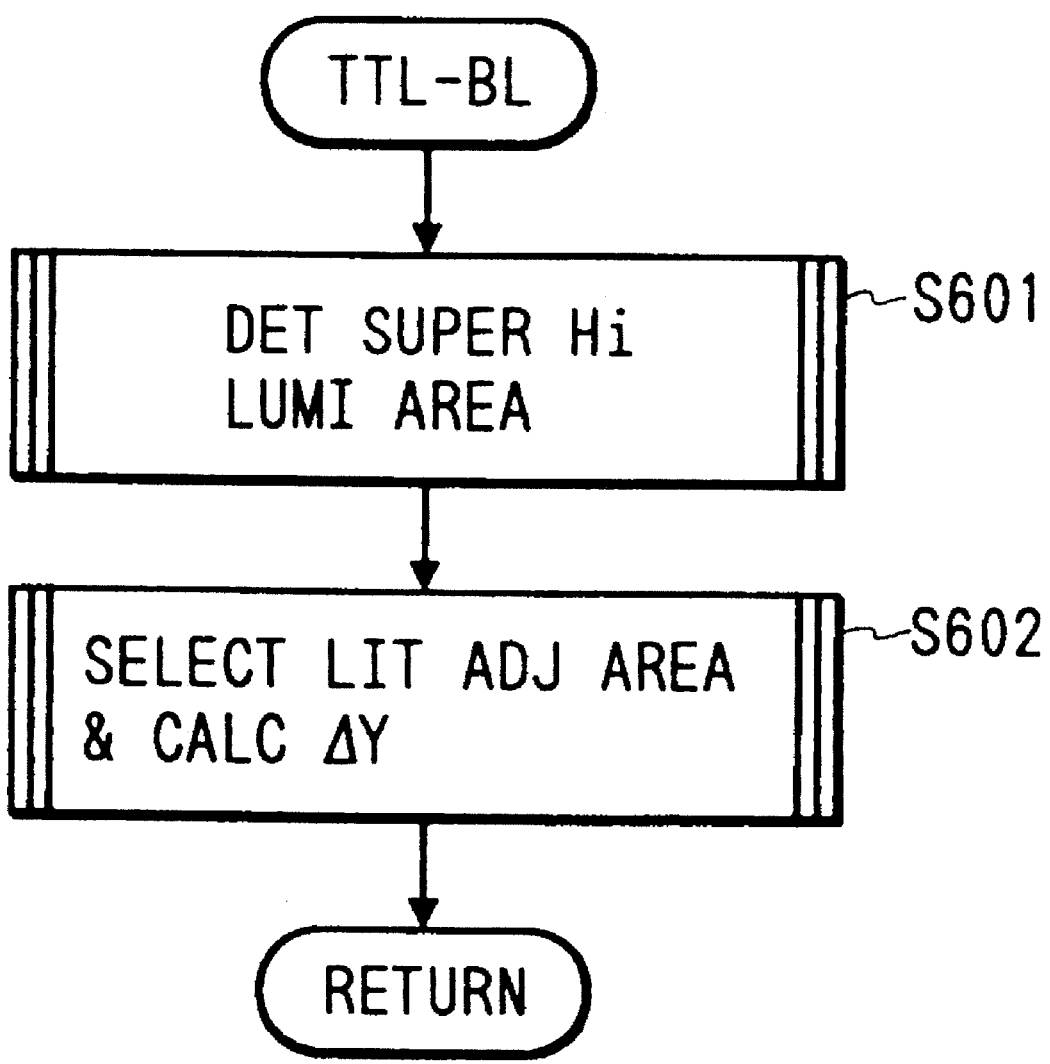
FIG. 25 is a subroutine flowchart showing the TTL-BL light adjustment in detail.

In FIG. 25, at first in step S601, the areas having the values more than the predetermined ones are detected with the output (luminance value BV (n) of the stationary light) of the photometric circuit 34 which performs photometry by the use of an exposure calculation element 8. Then in step S602, the determination of the light adjustment area and the calculation of the light adjustment correcting amount $\Delta Y$ are executed on the basis of the results of the processing performance in the step S601. Subsequently, the process will return to those shown in FIG. 7.

Figure 26:
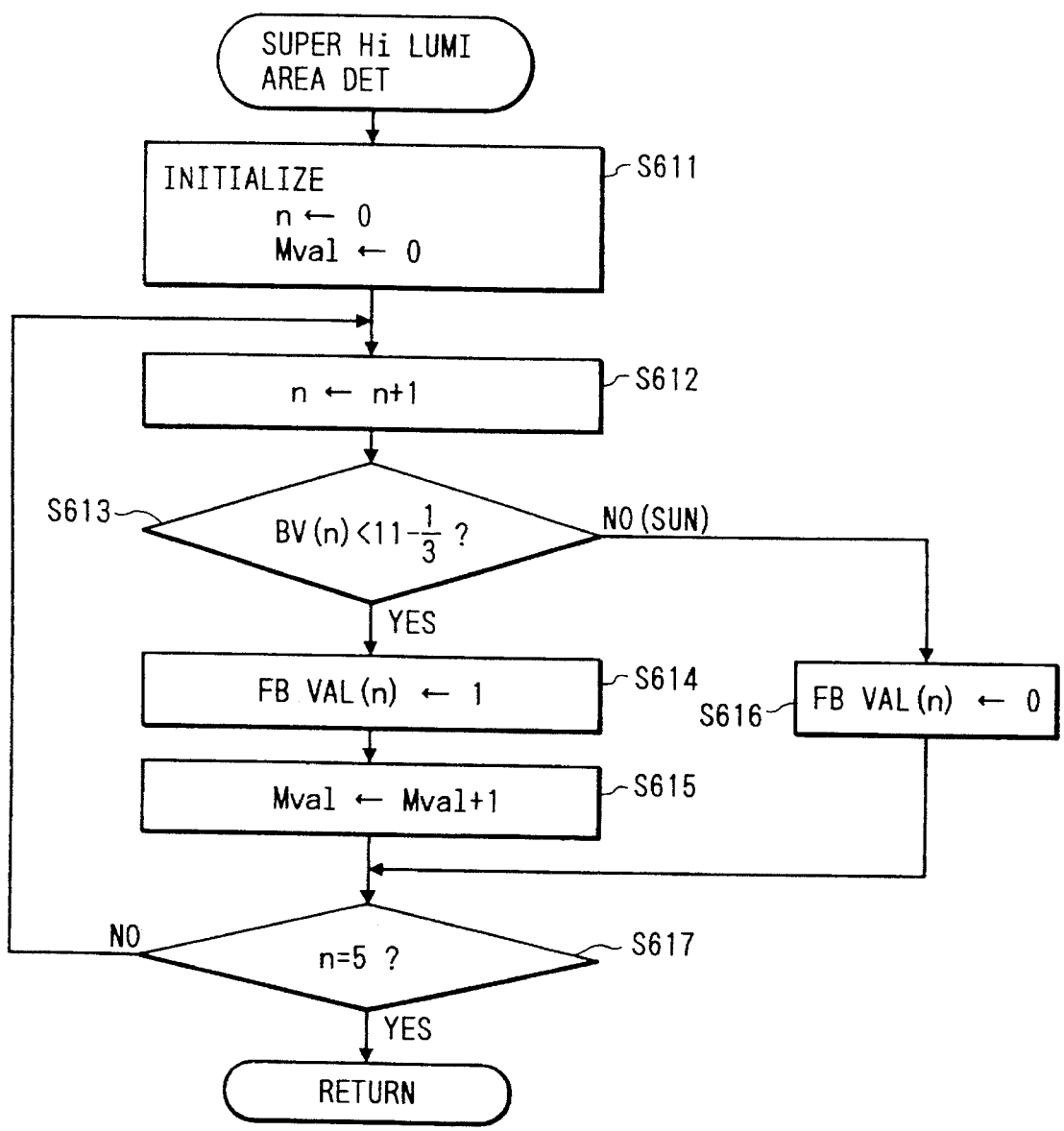
FIG. 26 is a subroutine flowchart showing a super-high luminance area detection process in detail.

FIG. 26 is a view showing the details of the above-mentioned S601.

At first, in step S611, zero is assigned to n and Mval to set initial values. Then, in step S612, only the n is incremented by 1, and the process will proceed to step S613. In the step S613, whether the segmented photometric luminance value BV (n) obtainable from the photometric circuit 34 is smaller than a value of 11+⅓ or not is examined. If it is found smaller, such an area is proposed as a candidate area which contributes to the light adjustment when a flash is triggered. Then, the process will proceed to step S614 to assign 1 to the flag FBVAL (n) corresponding to that area and proceed to step S615. In the step S615, the candidate number Mval of the area which contributes to the light adjustment is incremented by 1. Then the process will proceed to step S617.

On the other hand, in the step S613, when the segmented photometric luminance value BV (n) is found to be 11+⅓ or more, such an area is assumed to be the candidate area which is not allowed to contribute to the light adjustment when a flash is triggered. Then, in step S616, zero is assigned to the area flag FBVAL (n), and the process will proceed to step S617. In other words, when the luminance is 11+⅓ or more, there is a high probability that an extremely bright object (such as the sun which will produce an adverse effect on the light adjustment) is present in such area, and conceivably, there is a low probability that any main subject such as a person or some other object for the light adjustment is not present in the area. Therefore, such area is proposed as a cut area candidate.

In the step S617, the processes in the step S612 and thereafter are repeated until n reaches 5, that is, the status of the flag FBVAL (n) is defined for all the areas, and when the n has arrived at 5, the process will return to those in FIG. 25.

Figure 27:
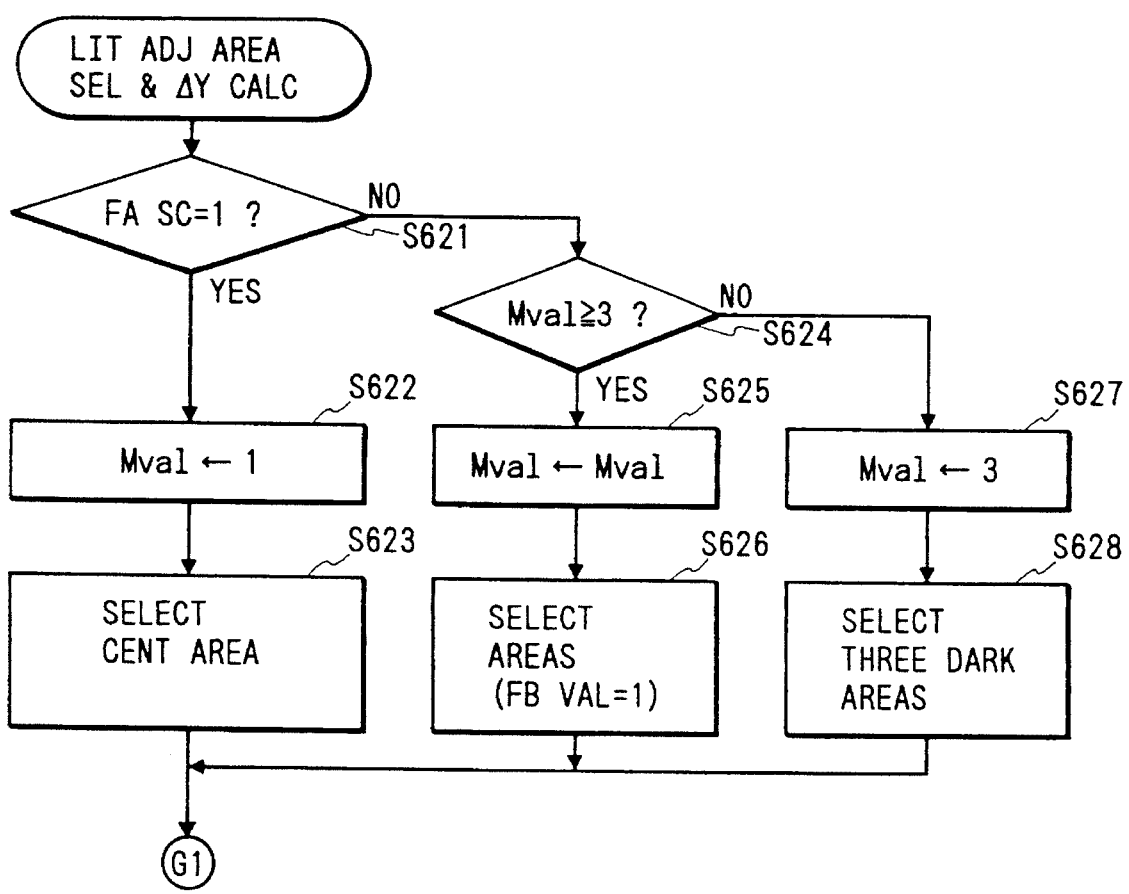
FIG. 27 is a subroutine flowchart showing processes in detail to determine the light adjustment area and calculate the light adjustment correcting amount.
Figure 28:
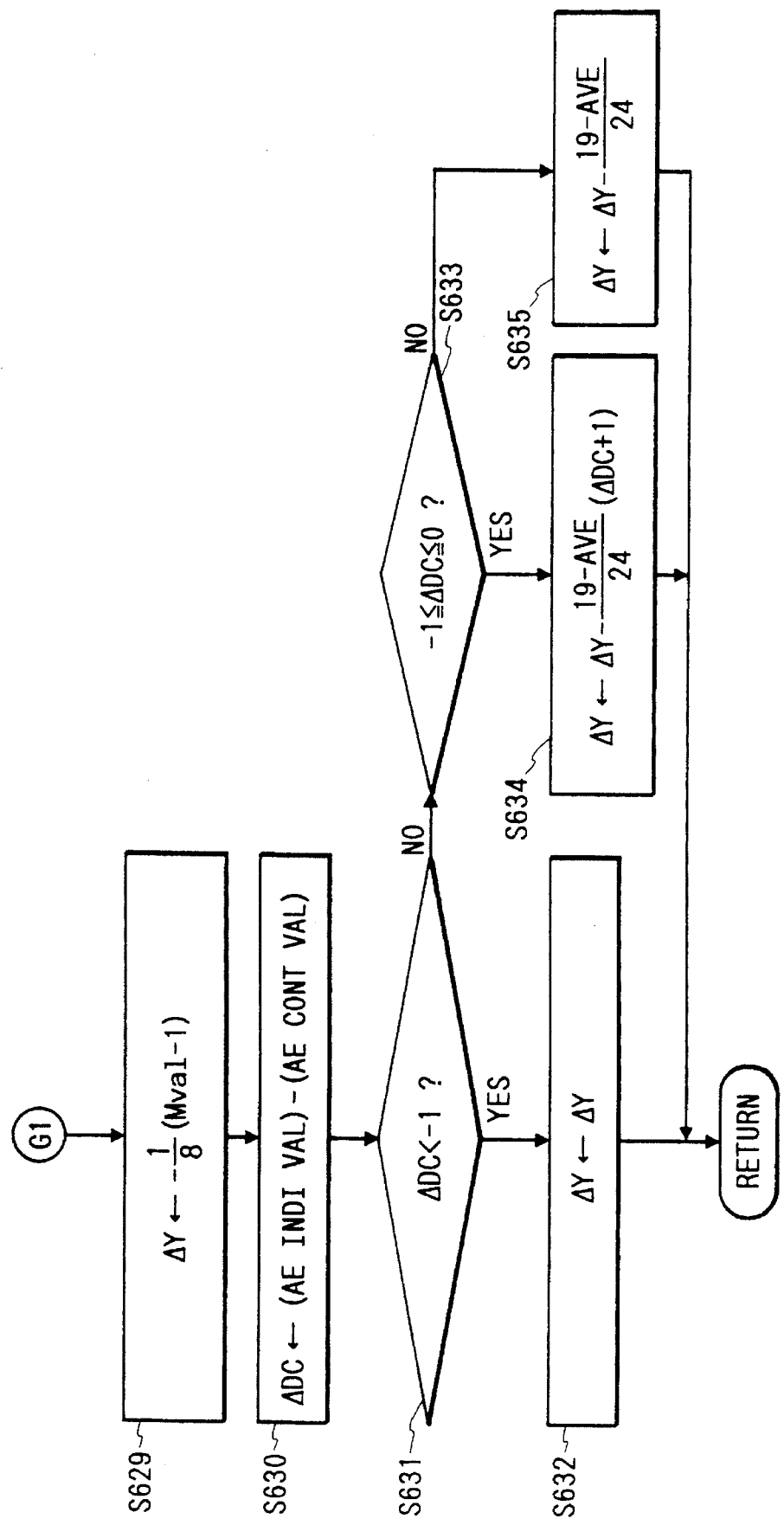
FIG. 28 is a flowchart continued from FIG. 27.

FIG. 27 and FIG. 28 are views showing the details of the process (the determination of the light adjustment areas and the calculation of the light adjustment correcting values $\Delta Y$) in the step S602 (FIG. 25).

Before describing this process, reference is made to the relationship between the exposure controlling photometric element 8 and the light receiving element 13 for light adjustment shown in FIG. 4. At first, the segmental shapes of both elements are almost the same. In other words, the area in the central portion of the image plane is circular for both of them. Then, the peripheral portions are divided into four areas, namely, upper left, upper right, lower left, and lower right. Also, the area numbers (No. 1 to No. 5) are common to both elements as shown in the following table:

TABLE 1

| | Photometric Area (Field Reference) | | | | |
|---|---|---|---|---|---|
| | Center | Upper left | Upper right | Lower left | Lower right |
| Exposure controlling photometric element 8 | #1 (8a) | #2 (8b) | #3 (8c) | #4 (8d) | #5 (8e) |
| Light receiving element 13 (for light adjustment) | #1 (13a) | #2 (13b) | #3 (13c) | #4 (13d) | #5 (13e) |

Here, in the description given below, the photometric area corresponding to the exposure controlling photometric element 8 is referred to as exposure controlling photometric area (first photometric area), and the photometric area corresponding to the light receiving element 13 for light adjustment is referred to as light adjustment photometric area (second photometric area).

Now, the processes in FIG. 27 and FIG. 28 will be described.

In steps S621 to S628 in FIG. 27, the number Mval of the areas which contribute to the light adjustment is finally decided and at the same time, the light adjustment areas are determined. At first, in the step S621, when the flag FASC is found to be 1, it is assumed that the subject is present in the central portion of the image plane, and the process will proceed to the step S622 to assign 1 to the Mval. Then, in the step S623, the light adjustment area is defined in the central portion, and the process will proceed to step S629 in FIG. 28.

On the other hand, in the step S621, if the flag FASC is not found to be 1, it is determined that there is no subject in the central portion of the image plane, and the process will proceed to the step S624. Then, if the Mval is three or more, that is, there exist three or more areas having the segmented photometric luminance value BV (n) which is less than 11+⅓, the process will proceed to the step S625. In the step S625, holding the Mval value as it is, the process will proceed to the step S626 to define the light adjustment photometric areas corresponding to all the exposure controlling photometric areas (the areas having the BV (n) which is less than 11+⅓) for which 1 is assigned to the flag FBVAL (n) as light adjustment areas. Then, the process will proceed to step S629 in FIG. 28.

Also, if Mval is found to be less than three in the step S624, that is, the areas, the segmented photometric luminance value BV (n) of which is less than 11+⅓, are less than three, the process will proceed to the step S627 to assign 3 to the Mval value and then, to the step S628. In the step S628, three areas are selected from the exposure controlling photometric area in the order of the darkness (lower value) of the luminance BV (n). Then, the light adjustment photometric areas of the same areas numbers as these areas are defined in the light adjustment area, and the process will proceed to step S629. However, in defining the three areas by the order of darkness, if the third and fourth areas have the same luminance value, the selection is made by giving priority to the one having a larger area number.

Here, when the Mval is less than three for the luminarice value BV (n), there is a higher probability that the main subject is present in the area which has been proposed as a cut area. Therefore, in order to prevent any area where a main subject exists from being excluded from the light adjustment objective areas, the three light adjustment area are forcibly defined. Also, at this juncture, the three areas are selected by the order of its darkness in the step S628. This is because of the fact that the darker the area is, the higher is the probability that a main subject exists in it. Further, the reason why the priority is given to the larger area number when the third and fourth areas have the same luminance value is that the main subject has been found by the process in the step S621 to be in the area other than the central portion (areas number 1).

In step S629, the light adjustment correcting amount $\Delta Y$ is calculated in accordance with the number Mval of the areas which contribute to the light adjustment. At this juncture, the $_\Delta Y$ is worked out as $$\Delta Y = -(Mval-1)/8$$

Figure 29:
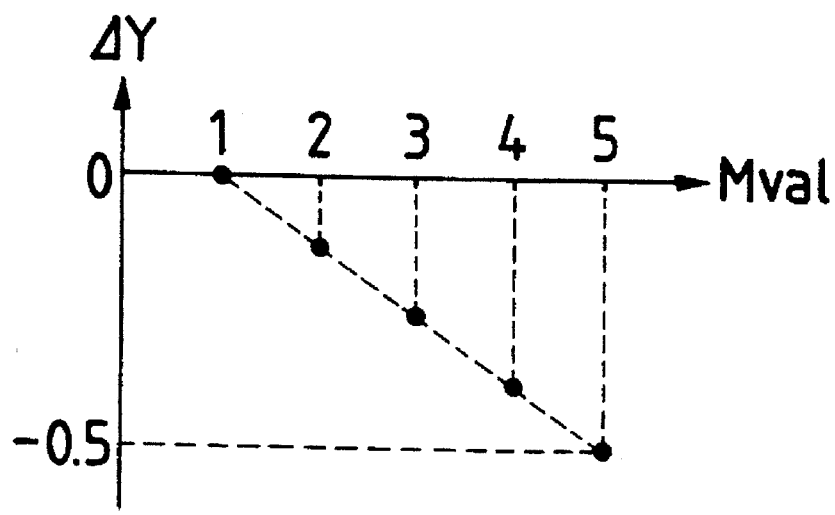
FIG. 29 is a view showing the light adjustment correcting amount with respect to the total number of light adjustment areas.

According to this expression, the more is the number of the areas contributing to the light adjustment, the greater becomes the $\Delta Y$ in the negative direction as shown in FIG. 29, for example. The flash of flashing means is controlled in the direction in which it is stopped earlier. As a result, it is possible to prevent any main subject from being over exposed even when the occupying ratio of the illumination objective subject (main subject) in an image plane is small.

In steps S630 to S635, the background light (stationary light) which illuminates a main subject, that is, the light beam other than the light beam emitted from the electronic flash apparatus, is caused to perform the light adjustment correction to match with the contributing amount which contributes to the exposure of the main subject.

At first, in the step S630, an AE indication value (BVans in the step S10 shown in FIG. 6) is subtracted by an AE controlling value (an exposure controlling value obtainable from an actual shutter seconds stop value used for a photographing), and the value thus obtained is defined as $\Delta DC$. Here, when the photography is conducted with a manual exposure mode or the shutter and stop are caused to be outside the interlocking range among some other cases, the $\Delta DC$ is not made zero, that is, the AE indication value becomes different from the AE controlling value.

Now, the process will proceed to the step S631 and further to the step S632 if the $_\Delta DC$ is less than −1, and return to the processes in FIG. 25 without changing the $\Delta Y$. Also, if the $_\Delta DC$ is not less than −1, the process will proceed to the step S633 and to the step S634 if the condition is $-1 \leq \Delta DC \leq 0$ at that stage. In the step S634, the $\Delta Y$ obtained in the step S629 is again corrected by the following equation:

$$\Delta Y = \Delta Y - (19 - AVE) \cdot (\Delta DC+1)/24$$

Figure 30:
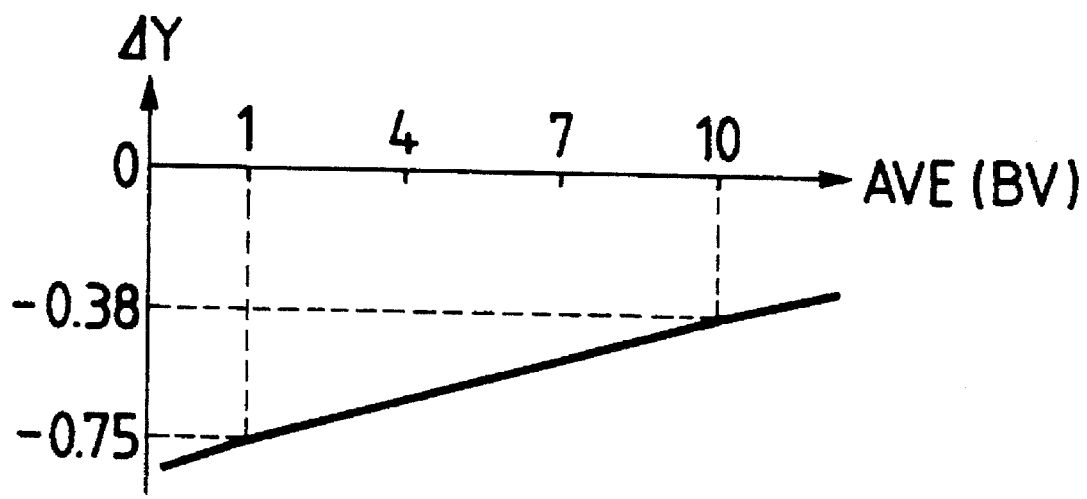
FIG. 30 is a view showing the light adjustment correcting amount with respect to the average luminance.

Then, the process will return to those in FIG. 25. Here, AVE is an average value of the luminance values BV (n) (n=1 to 5) of the stationary light detected by the exposure controlling photometric element 8. In the above-mentioned equation, the flashing amount of the flash apparatus is corrected to be smaller by the amount of illumination given to a main subject by the stationary light which illuminates the main subject. Therefore, as shown in FIG. 30, the darker the average luminance AVE is, the greater is the light adjustment correcting amount $_\Delta Y$ corrected in the negative direction. Also, the greater the above-mentioned $\Delta DC$ is, the greater becomes the $\Delta Y$ in the negative direction.

Also, in the step S633, if the condition is not $-1 \leq \Delta DC \leq 0$, the process will proceed to the step S635. Then the by obtained in the step S629 is again corrected by the following:

$$_\Delta Y - (19 - AVE)/24$$

and return to the processes in FIG. 25 to perform the $S_\beta$ calculation in the step S22 and the regular flashing in the step S23 sequentially. These processes have already been described. Here, therefore, the descriptions thereof are omitted.

These have been the procedures on the flash photography control by the CPU 31.

In the structure of the above-mentioned embodiment, the electronic flash apparatus 11 constitutes flashing means 101, light receiving element 13 for light adjustment and light adjustment circuit 50 constitute photometric means 102, the CPU 31 constitutes first and second photometric value correcting means 103 and 104, and the CPU 31 and light adjustment circuit 50 constitute light adjustment controlling means 105, respectively.

In this respect, the field is divided into the central area and four circumferential areas, totaling five areas, in the above-mentioned embodiment, but the dividing method and dividing number are not limited thereto. Also, it may be possible to obtain the above-mentioned correction coefficient $S\beta$ by way of $S\alpha$ x a predetermined value or $S^\alpha +$ a predetermined value.

Figure 33:
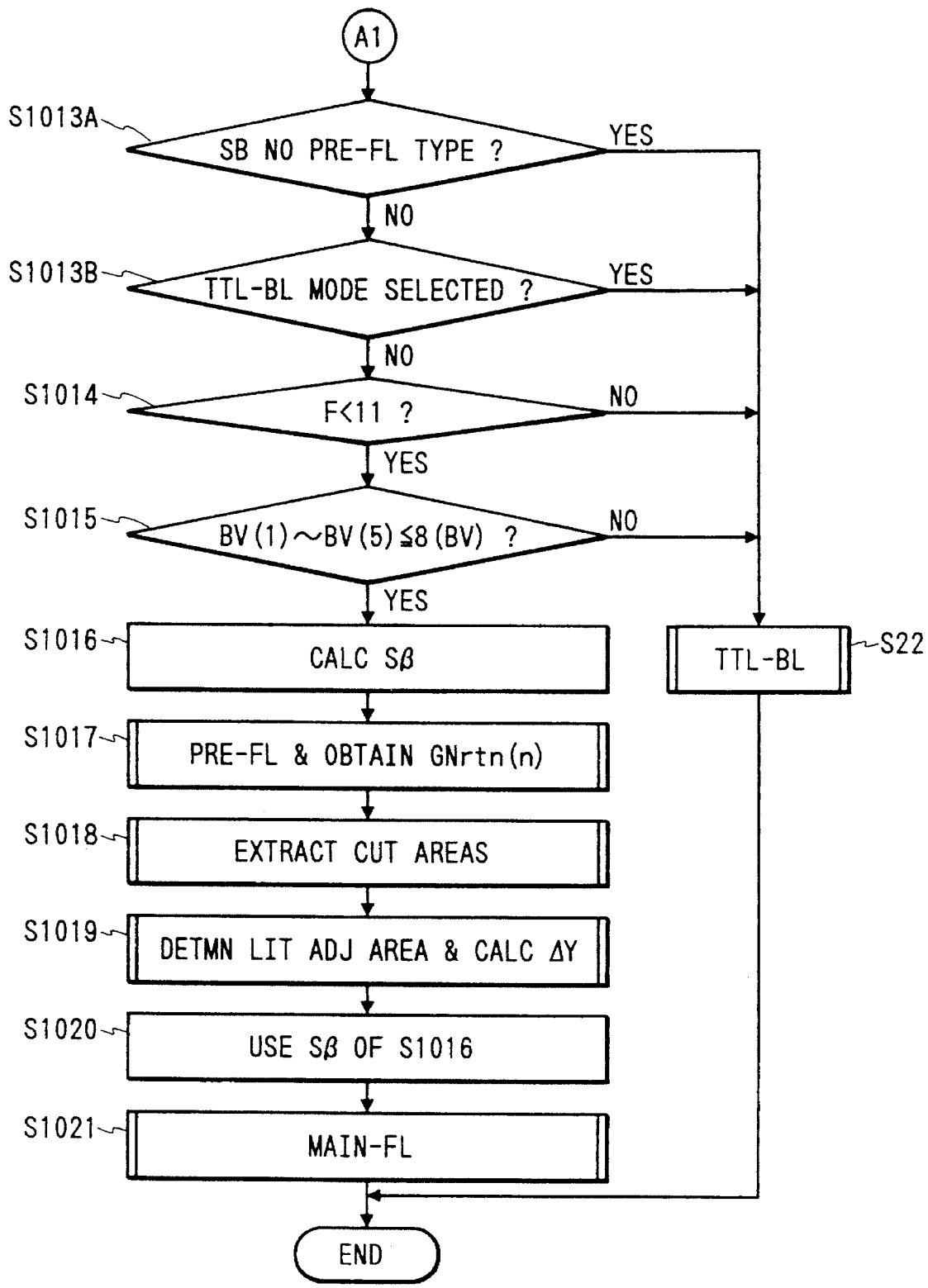
FIG. 33 is a flowchart corresponding to FIG. 7 showing a second embodiment.

Now, in conjunction with FIG. 33, still another embodiment will be described.

In this second embodiment, a surface treatment is given to the shutter blade surface of the shutter 10 in FIG. 2 in gray to provide a reflectance of approximately 18% (close to the reflectance of the film plane) and at the same time, the position of the shutter blade surface in the optical direction is set as close to the film plane as possible. In this way, the reflectance and diffusivity of the shutter blade surface and film plane are made almost equivalent between the shutter blade surface reflection photometry at the time of preliminary flashing and the film plane reflection photometry at the time of regular flashing. Also, the difference in the optical positions becomes a negligible amount. Therefore, it is possible to make the correction coefficient $S_\alpha$ in the step S16 and correction coefficient $S_\beta$ in the step S20 in FIG. 6 according to the first embodiment a common value in one and the same photometric area thereby to implement the reduction of the volume and easier processing in terms of the software. FIG. 33 shows an example thereof, and only its step S1016 differs from the above-mentioned step S16 in FIG. 6. In other words, the $S\beta$ value is calculated in the step S1016 and shares it with the step S20. As the value for the $S\beta$, the one shown in the aforesaid FIG. 32 should be adoptable.

According to the present invention, the photometric output of the photometry of a preliminary flash with its shutter blade surface reflection is corrected in accordance with the characteristics of the mounted photographic lens and at the same time, the photometric output of the photometry of the regular flash with its film plane reflection is corrected in accordance with the characteristics of the mounted photographic lens, and on the basis of these corrected values, the regular flashing is arranged to be suspended. As a result, it is possible to perform the light adjustment for a flash photography accurately irrespective of the characteristics of the mounted photographic lens and obtain a correct exposure at all the time. Also, it is possible to do likewise for photographic lenses to be marketed in the future.

According to the present invention, the photometric output of the photometry of a preliminary flash with its shutter blade surface reflection and the photometric output of the photometry of the regular flash with its film plane are arranged to be corrected by a common correction value for one and the same photometric area in accordance with the characteristics of the mounted photographic lens. As a result, it is possible to obtain the same effects as described above and at the same time, to implement the reduction of volume and simplification of processes in terms of the software as compared with the case where the correction is made by the use of the correction values individually.

What is claimed is:

1. An automatic light adjustment apparatus for a camera on which a photographic lens can be mounted freely, comprising:

a flash device which emits preliminary flash light and thereafter emits regular flash light to a field to be photographed;

a light metering device for metering through-lens-light through said photographic lens, the light being included in said flash light of said flash device reflected by said field to be photographed;

an optical element disposed at a side of said photographic lens opposite to said field, said optical element directing through-lens-light reflected by a shutter blade surface to said light metering device during said preliminary flash light and directing through-lens-light reflected by a film plane to said light metering device during said regular flash light, said light metering device metering through-lens-light from a plurality of areas of said field, outputting a plurality of first light metering outputs relating to said plurality of areas in response to said preliminary flash light and outputting a plurality of second light metering outputs relating to said plurality of areas in response to said regular flash light; and a controlling device which corrects a plurality of said first and said second light metering outputs in accordance with characteristics of a mounted photographic lens and suspends the regular flash light emission based on the corrected light metering outputs.

2. An automatic light adjustment apparatus for a camera according to claim 1, wherein:

the characteristics of said lens are concerned with the exit pupil distance.

3. An automatic light adjustment apparatus for a camera according to claim 1, wherein:

the characteristics of said lens are concerned with the stop value.

4. An automatic light adjustment apparatus for a camera according to claim 1, wherein:

said light reflected by said shutter blade surface is diffused light reflected by almost the whole area of said shutter blade surface.

5. An automatic light adjustment apparatus for a camera on which a photographic lens can be mounted freely, comprising:

a flash device which emits preliminary flash light and thereafter emits regular flash light to a field to be photographed;

a light metering device for metering through-lens-light through said photographic lens, the light being included in said flash light of said flash device reflected by said field to be photographed;

an optical element disposed at a side of said photographic lens opposite to said field, said optical element directing through-lens-light reflected by a shutter blade surface to said light metering device during said preliminary flash light and directing through-lens-light reflected by a film plane to said light metering device during said regular flash light, said light metering device metering through-lens-light from a plurality of areas of said field, outputting a plurality of first light metering outputs relating to said plurality of areas in response to said preliminary flash light and outputting a plurality of second light metering outputs relating to said plurality of areas in response to said regular flash light; and a controlling device which corrects a plurality of said first and said second light metering outputs by using a common correction value for one and the same area in accordance with characteristics of a mounted photographic lens and suspends the regular flash light emission based on the corrected light metering outputs.

6. An automatic light adjustment apparatus for a camera according to claim 5, wherein:

said shutter blade surface is colored to be provided with 18% reflectance.

7. An automatic light adjustment apparatus for a camera according to claim 5, wherein:

the characteristics of said lens are concerned with the exit pupil distance.

8. An automatic light adjustment apparatus for a camera according to claim 5, wherein:

the characteristics of said lens are concerned with the stop value.

9. An automatic light adjustment apparatus for a camera according to claim 5, wherein:

said light reflected by said shutter blade surface is diffused light reflected by almost the whole area of said shutter blade surface.

10. An automatic light adjustment apparatus for a camera on which a photographic lens can be mounted freely, comprising:

a flash device which emits preliminary flash light and thereafter emits regular flash light to a field to be photographed;

a light metering device for metering through-lens-light through said photographic lens, the light being included in said flash light of said flash device reflected by said field to be photographed:

an optical element disposed at a side of said photographic lens opposite to said field, said optical element directing through-lens-light reflected by a shutter blade surface to said light metering device during said preliminary flash light and directing through-lens-light reflected by a film plane to said light metering device during said regular flash light, said light metering device metering through-lens-light from a plurality of areas of said field, outputting a plurality of first light metering outputs relating to said plurality of areas in response to said preliminary flash light and outputting a plurality of second light metering outputs relating to said plurality of areas in response to said regular flash light; and a controlling device which corrects a plurality of said first and said second light metering outputs in accordance with characteristics of a mounted photographic lens, determines a condition of said regularly flash light emission in accordance with the corrected first light metering outputs and suspends the regularly flash light emission based on the corrected second light metering outputs.

11. An automatic light adjustment apparatus for a camera according to claim 10, wherein:

the characteristics of said lens are concerned with an amount of the exit pupil distance.

12. An automatic light adjustment apparatus for a camera according to claim 10, wherein:

the characteristics of said lens are concerned with an amount of the stop value.

13. An automatic light adjustment apparatus for a camera according to claim 10, wherein:

said light reflected by said shutter blade surface is diffused light reflected by almost the whole area of said shutter blade surface.

14. An automatic light adjustment apparatus for a camera on which a photographic lens can be mounted freely, comprising:

a flash device which emits preliminary flash light and thereafter emits regular flash light to a field to be photographed;

a light metering device for metering through-lens-light through said photographic lens, the light being included in said flash light of said flash device reflected by said field to be photographed;

an optical element disposed at a side of said photographic lens opposite to said field, said optical element directing through-lens-light reflected by a shutter blade surface to said light metering device during said preliminary flash light and directing through-lens-light reflected by a film plane to said light metering device during said regular flash light, said light metering device metering through-lens-light from a plurality of areas of said field, outputting a plurality of first light metering outputs relating to said plurality of areas in response to said preliminary flash light and outputting a plurality of second light metering outputs relating to said plurality of areas in response to said regular flash light; and a controlling device which corrects a plurality of said first and said second light metering outputs by using a common correction value for one and the same area in accordance with characteristics of a mounted photographic lens, determines a condition of said regular flash light emission in accordance with the corrected first light metering outputs and suspends the regular flash light emission based on the corrected second light metering outputs.

15. An automatic light adjustment apparatus for a camera according to claim 14, wherein:

the characteristics of said lens are concerned with an amount of the exit pupil distance.

16. An automatic light adjustment apparatus for a camera according to claim 14, wherein:

the characteristics of said lens are concerned with an amount of the stop value.

17. An automatic light adjustment apparatus for a camera according to claim 14, wherein:

said light reflected by said shutter blade surface is diffused light reflected by almost the whole area of said shutter blade surface.

* * * * *